United States Patent
Nie et al.

(10) Patent No.: US 11,922,681 B2
(45) Date of Patent: Mar. 5, 2024

(54) SYSTEMS AND METHODS FOR IDENTIFYING CELL CLUSTERS WITHIN IMAGES OF STAINED BIOLOGICAL SAMPLES

(71) Applicant: VENTANA MEDICAL SYSTEMS, INC., Tucson, AZ (US)

(72) Inventors: Yao Nie, Sunnyvale, CA (US); Safoora Yousefi, Atlanta, GA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 361 days.

(21) Appl. No.: 17/213,445

(22) Filed: Mar. 26, 2021

(65) Prior Publication Data

US 2021/0216746 A1 Jul. 15, 2021

Related U.S. Application Data

(63) Continuation of application No. PCT/US2019/055558, filed on Oct. 10, 2019.

(60) Provisional application No. 62/830,823, filed on Apr. 8, 2019, provisional application No. 62/745,953, filed on Oct. 15, 2018.

(51) Int. Cl.
*G06V 10/82* (2022.01)
*G06F 18/214* (2023.01)
*G06F 18/231* (2023.01)
*G06F 18/243* (2023.01)
*G06V 10/25* (2022.01)
*G06V 10/44* (2022.01)
*G06V 10/764* (2022.01)
*G06V 20/69* (2022.01)

(52) U.S. Cl.
CPC .......... *G06V 10/82* (2022.01); *G06F 18/2155* (2023.01); *G06F 18/231* (2023.01); *G06F 18/243* (2023.01); *G06V 10/25* (2022.01); *G06V 10/454* (2022.01); *G06V 10/764* (2022.01); *G06V 20/695* (2022.01); *G06V 20/698* (2022.01); *G06V 2201/03* (2022.01)

(58) Field of Classification Search
None
See application file for complete search history.

(56) References Cited

U.S. PATENT DOCUMENTS 11,017,261 B1 * 5/2021 Zheng .................. G06V 10/454
11,294,952 B2 * 4/2022 Tsai ..................... G06V 10/764
(Continued)

OTHER PUBLICATIONS

Wahab Noorul et al: "Two-phase deep convolutional neural network for reducing class skewness in histopathological images based breast cancer detection", Computers in Biology and Medicine, New York, NY, US, vol. 85, Apr. 18, 2017, pp. 86-97, XP085046093, ISSN: 0010-4825, DOI: 10.1016/J.CO (Year: 2017).*

(Continued)

*Primary Examiner* — Tahmina N Ansari
(74) *Attorney, Agent, or Firm* — Charney IP Law LLC; Thomas M. Finetti

(57) ABSTRACT

The present disclosure relates to automated systems and methods adapted to quickly and accurately train a neural network to detect and/or classify cells and/or nuclei. The present disclosure also relates to automated systems and methods for using a trained cell detection and classification engine, such as one including a neural network, to classify cells within an unlabeled image.

19 Claims, 18 Drawing Sheets

(56) References Cited

U.S. PATENT DOCUMENTS

| | | | |
|---|---|---|---|
| 11,417,082 B2* | 8/2022 | Zheng | G06V 10/764 |
| 2018/0286040 A1* | 10/2018 | Sashida | G06F 18/2414 |
| 2021/0216746 A1* | 7/2021 | Nie | G06F 18/2413 |

OTHER PUBLICATIONS

Zhaowei Cai et al. "A Unified Multi-scale Deep Convolutional Neural Network for Fast Object Detection", Computer Vision—ECCV 2016, Jan. 1, 2016 (Jan. 1, 2016), XP055573895, DOI: 10.1007/978-3-319-46493-0 22 ISBN: 978-3-319-46493-0. Retrieved Online: URL:https://link.springer.com/content/pdf (Year: 2016).*

* cited by examiner

SYSTEMS AND METHODS FOR IDENTIFYING CELL CLUSTERS WITHIN IMAGES OF STAINED BIOLOGICAL SAMPLES

CROSS-REFERENCE TO RELATED APPLICATIONS

This application claims the benefit of the filing date of International Application No. PCT/US2019/055558 filed on Oct. 10, 2019, which application claims the benefit of the filing date of U.S. Application No. 62/830,823 filed on Apr. 8, 2019; and also claims the benefit of the filing date of U.S. Application No. 62/745,953 filed on Oct. 15, 2018, the disclosures of which are each hereby incorporated by reference herein in their entireties.

BACKGROUND OF THE DISCLOSURE

Digital pathology involves scanning of whole histopathology or cytopathology glass slides into digital images interpretable on a computer screen. These images are subsequently processed using an imaging algorithm or interpreted by a pathologist. In order to examine tissue sections (which are virtually transparent), tissue sections are prepared using colored histochemical stains that bind selectively to cellular components. Color-enhanced, or stained, cellular structures are used by clinicians or a computer-aided diagnosis (CAD) algorithm to identify morphological markers of a disease, and to proceed with therapy accordingly. Observing the assay enables a variety of processes, including diagnosis of disease, assessment of response to treatment, and development of new drugs to fight disease.

Immunohistochemical (IHC) slide staining can be utilized to identify proteins in cells of a tissue section and hence is widely used in the study of different types of cells, such as cancerous cells and immune cells in biological tissue. Thus, IHC staining may be used in research to understand the distribution and localization of the differentially expressed biomarkers of immune cells (such as T-cells or B-cells) in a cancerous tissue for an immune response study. For example, tumors often contain infiltrates of immune cells, which may prevent the development of tumors or favor the outgrowth of tumors.

In-situ hybridization (ISH) can be used to look for the presence of a genetic abnormality or condition such as amplification of cancer causing genes specifically in cells that, when viewed under a microscope, morphologically appear to be malignant. In situ hybridization (ISH) employs labeled DNA or RNA probe molecules that are anti-sense to a target gene sequence or transcript to detect or localize targeted nucleic acid target genes within a cell or tissue sample. ISH is performed by exposing a cell or tissue sample immobilized on a glass slide to a labeled nucleic acid probe which is capable of specifically hybridizing to a given target gene in the cell or tissue sample. Several target genes can be simultaneously analyzed by exposing a cell or tissue sample to a plurality of nucleic acid probes that have been labeled with a plurality of different nucleic acid tags. By utilizing labels having different emission wavelengths, simultaneous multicolored analysis may be performed in a single step on a single target cell or tissue sample. For example, the INFORM HER2 Dual ISH DNA Probe Cocktail Assay from Ventana Medical Systems, Inc., is intended to determine HER2 gene status by enumeration of the ratio of the HER2 gene to Chromosome 17. The HER2 and Chromosome 17 probes are detected using a two-color chromogenic ISH in formalin-fixed, paraffin-embedded human breast cancer tissue specimens.

BRIEF SUMMARY OF THE DISCLOSURE

Cell and/or nucleus detection is a core task in digital pathology and, in general, refers to the identification and localization of individual cells in images of stained cancerous tissue. Cancer histology images come in varied sizes, resolutions, stain types, and are crowded with visually heterogeneous, overlapping cells. Among the challenges that are commonly faced in cell and/or nucleus detection from these images are the difficulty, and sometimes impossibility, of obtaining ground truth annotations; and applying a model tuned for a specific resolution or stain to a dataset having a different resolution or different stain. Indeed, the process of ground truth labeling is often laborious, requiring a large time commitment. Accordingly, it would be desirable to develop systems and methods that would facilitate ground truth labeling for cell and/or nucleus classification.

In view of the foregoing, Applicant has developed systems and methods which facilitate the generation of ground truth data in a quick and robust manner, thus solving the problem of the laborious task of ground truth annotation. To achieve this, and as described in detail herein, the systems and methods facilitate the generation of homogeneous clusters of cells and/or nuclei in sample images, where the generated homogeneous clusters themselves may be annotated (not the individual cells and/or nuclei). This reduces the burden of ground truth labeling from an order of the number of cells in the dataset to the number of identified clusters in the dataset. The generation of homogeneous clusters of cells and/or nuclei is unconventional and thus transforms the system input to an output which enables quick and accurate ground truth generation. As such, the technical problem of ground truth annotation is solved by using a system adapted to quickly and accurately generate homogeneous clusters, such as a system pre-trained with an image dataset unrelated to histology images and/or cytologist images, and/or one which is only minimally tuned using histology and/or cytology images. The systems and methods described herein also enable quick and accurate detection of cells and/or nuclei in test images using a cell detection and classification engine, thereby facilitating accurate diagnosis of diseases, such as cancer, and thus enhanced treatment for afflicted subjects, e.g. human patients. The systems and methods described herein are tied to tangible sources of data, i.e. image data corresponding to biological specimens, such as biological specimens derived from a patient in need of treatment.

In one aspect of the present disclosure is a system for identifying clusters of cells within a sample image of a biological specimen stained for the presence of one or more biomarkers, the system comprising: (i) one or more processors, and (ii) one or more memories coupled to the one or more processors, the one or more memories to store computer-executable instructions that, when executed by the one or more processors, cause the system to perform operations comprising: (a) detecting cells in the sample image using a trained object detection engine, wherein the trained object detection engine comprises a convolutional neural network adapted to detect cellular features within the sample image; (b) extracting cellular features from one or more layers of the convolutional neural network; and (c) clustering the detected cells in the sample image based on the extracted cellular features to provide one or more homogeneous clusters of detected cells.

In some embodiments, the trained object detection engine comprises a region-based convolutional neural network. In some embodiments, the region-based convolution neural network is adapted from Fast-RCNN. In some embodiments, the trained object detection engine is adapted from Faster-RCNN. In some embodiments, the trained object detection engine further comprises a region proposal network.

In some embodiments, the convolutional neural network of the trained object detection engine is adapted from one of LeNet, AlexNet, ZF Net, DetectNet, GoogleNet, VGGNet, VGG16, and DenseNet, or any variant thereof. In some embodiments, the convolutional neural network of the trained object detection engine is a deep residual network. In some embodiments, the deep residual network is adapted from ResNet. In some embodiments, the neural network is an autoencoder neural network.

In some embodiments, the convolutional neural network comprises at least one scaling layer. In some embodiments, the at least one scaling layer scales the sample image by a constant factor. In some embodiments, the clustering of the detected cells comprises performing agglomerative hierarchical clustering.

In some embodiments, the convolutional neural network is trained using a dataset comprising a plurality of training images, wherein each training image of the plurality of training images is derived from a biological specimen stained with a primary stain or stained for the presence of one or more biomarkers (e.g. a plurality of training images stained for the presence of HER2). In some embodiments, each training image of the plurality of training images comprises at least one class label. In some embodiments, each training image of the plurality of training images does not comprise any class labels. In some embodiments, each training image of the plurality of training images does not comprise any pathologist annotations. In those embodiments where the object detection engine is trained using training images including at least one class label, the system may further comprise instructions for classifying the detected cells. In some embodiments, the sample image comprises a stain which differs from a stain in any of the plurality of training images used to train the object detection engine.

In some embodiments, the system is adapted to receive annotations corresponding to at least one of the one or more provided homogeneous clusters of cells in the sample image. In some embodiments, the annotations are provided by a pathologist.

In some embodiments, the system further comprises instructions for training a cell detection and classification engine using the received annotations. In some embodiments, the system further comprises instructions for detecting cells in a test image using the trained cell detection and classification engine. In some embodiments, the system further comprises instructions for classifying cells in the test image using the trained cell detection and classification engine. In some embodiments, the test image comprises at least one stain. In some embodiments, the at least one stain of the test image is a cellular stain. In some embodiments, the at least one stain of the test image is a membrane stain. In some embodiments, at least one stain in the test image differs from a stain used to train the cell detection and classification engine.

In some embodiments, the cell detection and classification engine comprises a neural network. In some embodiments, the neural network is adapted from LeNet, AlexNet, ZF Net, DetectNet, GoogleNet, VGGNet, VGG16, DenseNet, or ResNet. In some embodiments, the neural network is an autoencoder neural network. In other embodiments, the cell detection and classification engine includes a classifier. In some embodiments, the classifier is a support vector machine or an ensemble learning method, e.g. a random forest supervised learning algorithm. In some embodiments, the cell detection and classification module comprises a neural network and a classifier. In some embodiments, the neural network of the cell detection and classification module is adapted to extract features from inputted test images.

In some embodiments, the system further comprises instructions for fine-tuning the trained object detection engine using the received annotations to provide a fine-tuned object detection engine. In some embodiments, the system further comprises instructions for detecting cells in a test image using the fine-tuned object detection engine. In some embodiments, the system further comprises instructions for classifying cells in the test image using the fine-tuned object detection engine.

In another aspect of the present disclosure is a non-transitory computer-readable medium storing instructions for identifying clusters of cells within a sample image of a biological specimen stained for the presence of one or more biomarkers comprising: (a) detecting cells in the sample image using a trained object detection engine, wherein the trained object detection engine comprises a first portion and a second portion, wherein the first portion is configured to identify cellular features within the sample image, and wherein the second portion is configured to detect the cells based on the identified cellular features; (b) extracting at least a portion of the identified cellular features from one or more layers of the trained object detection engine; and (c) clustering the detected cells in the sample image based on the extracted cellular features to provide one or more homogeneous clusters of detected cells.

In some embodiments, the first portion comprises a neutral network. In some embodiments, the neural network is a convolutional neural network. In some embodiments, the convolutional neural network is adapted from LeNet, AlexNet, ZF Net, DetectNet, GoogleNet, VGGNet, VGG16, and DenseNet. In some embodiments, the convolutional neural network is a deep residual network. In some embodiments, the deep residual network is adapted from ResNet. In some embodiments, the second portion comprises a region proposal network. In some embodiments, the object detection engine is trained using a dataset comprising a plurality of training images derived from biological specimens stained with a primary stain or stained for the presence of one or more biomarkers. In some embodiments, the object detection engine is trained using a dataset comprising a plurality of training images, wherein each training image of the plurality of training images is stained with a primary stain or stained for the presence of one or more biomarkers, and each training image of the plurality of training images does not comprise any class labels or pathologist annotations.

In another aspect of the present disclosure is a non-transitory computer-readable medium storing instructions for identifying clusters of cells within a sample image of a biological specimen stained for the presence of one or more biomarkers comprising: (a) detecting cells in the sample image using a trained object detection engine, wherein the trained object detection engine comprises a convolutional neural network adapted to detect cellular features within the sample image; (b) extracting cellular features from one or more layers of the convolutional neural network; and (c)

clustering the detected cells in the sample image based on the extracted cellular features to provide one or more homogeneous clusters of detected cells.

In some embodiments, the object detection engine is trained using a dataset comprising a plurality of training images derived from biological specimens stained with a primary stain or stained for the presence of one or more biomarkers. In some embodiments, the object detection engine is trained using a dataset comprising a plurality of training images, wherein each training image of the plurality of training images is stained with a primary stain or stained for the presence of one or more biomarkers, and each training image of the plurality of training images does not comprise any class labels or pathologist annotations.

In some embodiments, the convolutional neural network is adapted from LeNet, AlexNet, ZF Net, DetectNet, GoogleNet, VGGNet, VGG16, and DenseNet. In some embodiments, the convolutional neural network is a deep residual network. In some embodiments, the deep residual network is adapted from ResNet. In some embodiments, the trained object detection engine comprises a network architecture adapted from Faster-RCNN. In some embodiments, the neural network is an autoencoder neural network.

In some embodiments, the non-transitory computer-readable medium further comprises instructions for training a cell detection and classification engine using pathologist annotations corresponding to at least one of the one or more homogeneous clusters of cells in the sample image. In some embodiments, the non-transitory computer-readable medium further comprises instructions for detecting cells in a test image using the trained cell detection and classification engine. In some embodiments, the non-transitory computer-readable medium further comprises instructions for classifying detected cells in a test image using the trained cell detection and classification engine. In some embodiments, the cell detection and classification engine comprises a neural network. In some embodiments, the cell detection and classification engine comprises a support vector machine.

In some embodiments, the non-transitory computer-readable medium further comprises instructions for fine-tuning the trained object detection engine using received annotations for the at least one of the one or more homogeneous clusters of cells in the sample image to provide a fine-tuned object detection engine. In some embodiments, the non-transitory computer-readable medium further comprises instructions for detecting cells in a test image using the fine-tuned object detection engine.

In another aspect of the present disclosure is a method of identifying clusters of cells within a sample image of a biological specimen stained for the presence of one or more biomarkers comprising: detecting cells in the sample image using a trained object detection engine, wherein the trained object detection engine comprises a convolutional neural network and a region proposal network, wherein the convolutional neural network is configured to identify cellular features and wherein the region proposal network is configured to detect cells based on the identified cellular features; extracting the identified cellular features from one or more layers of the convolutional neural network; and clustering the detected cells in the sample image based on the extracted cellular features to provide one or more homogeneous clusters of detected cells.

In some embodiments, the trained object detection engine comprises a region-based convolutional neural network. In some embodiments, the region-based convolution neural network is adapted from Fast-RCNN. In some embodiments, the trained object detection engine is adapted from Faster-RCNN. In some embodiments, the convolutional neural network is adapted from LeNet, AlexNet, ZF Net, DetectNet, GoogleNet, VGGNet, VGG16, and DenseNet. In some embodiments, the convolutional neural network is a deep residual network. In some embodiments, the deep residual network is adapted from ResNet. In some embodiments, the convolution neural network is an autoencoder neural network.

In some embodiments, the object detection engine is trained using a dataset comprising a plurality of training images derived from biological specimens stained with a primary stain or stained for the presence of one or more biomarkers. In some embodiments, the object detection engine is trained using a dataset comprising a plurality of training images, wherein each training image of the plurality of training images is stained with a primary stain or stained for the presence of one or more biomarkers, and each training image of the plurality of training images does not comprise any class labels or pathologist annotations.

In another aspect of the present disclosure is a method of detecting cells in a test image of a biological specimen stained for the presence of one or more biomarkers comprising: determining cellular features within the test image of the biological specimen by inputting the test image into a first portion of a trained cell detection and classification engine, wherein the first portion comprises a convolutional neural network configured for detecting cellular features; and detecting the cells in the test image based on the determined cellular features by inputting the determined features of the test image into a second portion of the trained cell detection and classification engine, wherein the second portion comprises at least a region proposal network. In some embodiments, the convolutional neural network is a deep residual network. In some embodiments, the deep residual network is adapted from ResNet.

In some embodiments, the method further comprises classifying the detected cells in the test image. In some embodiments, the cell detection and classification engine is trained using ground truth data, wherein the ground truth data comprises pathologist annotations corresponding to one or more identified homogeneous clusters of cells derived from one or more sample images. In some embodiments, the homogeneous clusters of cells derived from the one or more sample images are identified by: (i) providing a sample image to a trained object detection engine; (ii) detecting cells in the sample image using the trained object detection engine; (iii) extracting a plurality of cellular features from at least one of the convolutional layers within the trained object detection engine; and (iv) clustering the detected cells in the test image based on the extracted cellular features. In some embodiments, the object detection engine is trained with a dataset comprising a plurality of training images, each training image of the plurality of training images derived from a biological specimen stained with a primary stain or stained for the presence of one or more biomarkers.

In another aspect of the present disclosure is a method of detecting cells in a test image of a biological specimen stained for the presence of one or more biomarkers comprising: determining cellular features within the test image of the biological specimen by inputting the test image into a first portion of a trained cell detection and classification engine, wherein the first portion comprises a neural network configured for detecting cellular features; and detecting the cells in the test image based on the determined cellular features by inputting the determined features of the test image into a second portion of the trained cell detection and classification engine, wherein the second portion comprises a trained classifier. In some embodiments, the trained classifier comprises a support vector machine or a random forest ensemble learning method.

BRIEF DESCRIPTION OF THE FIGURES

For a general understanding of the features of the disclosure, reference is made to the drawings. In the drawings, like reference numerals have been used throughout to identify identical elements.

DETAILED DESCRIPTION

Figure 1:
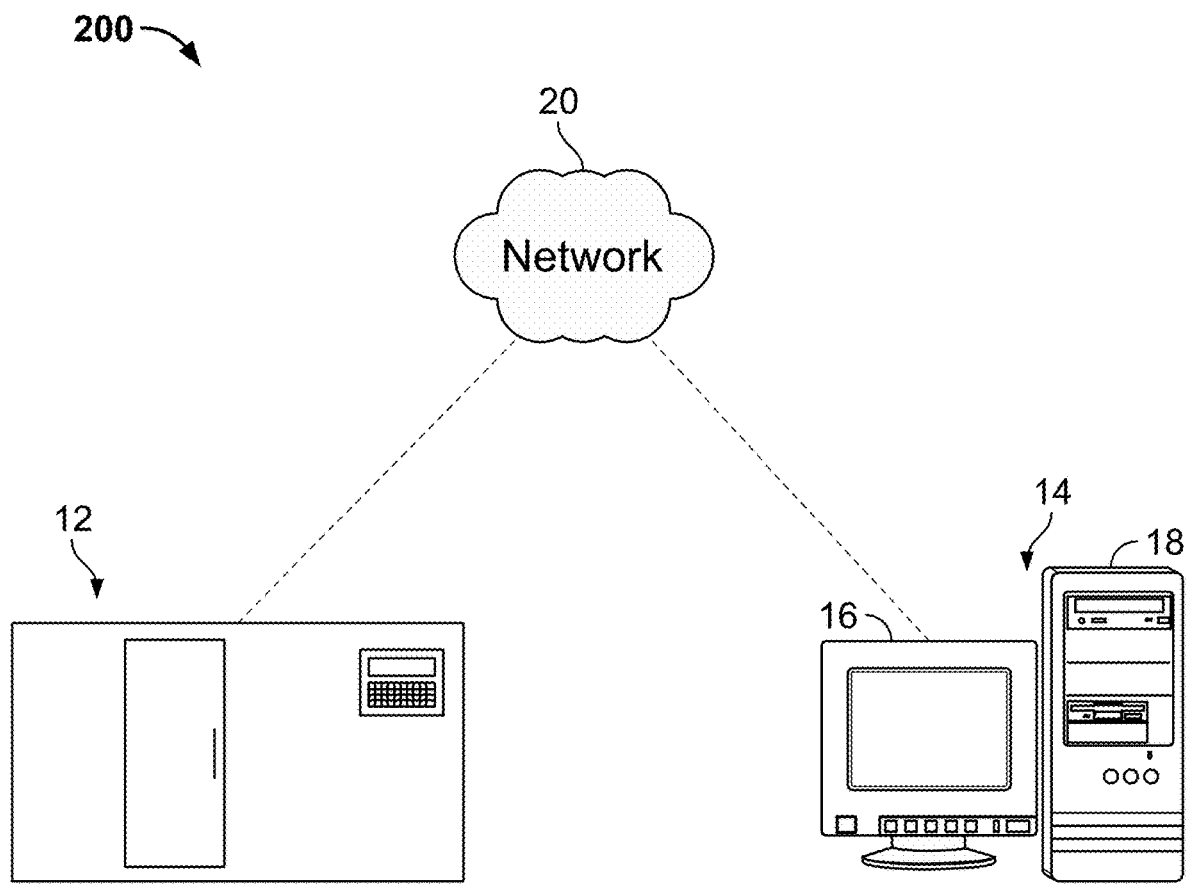
FIG. 1 illustrates a representative digital pathology system including an image acquisition device and a computer system in accordance with one embodiment of the present disclosure.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used herein, the terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the terms "biological specimen," "sample," or "tissue sample" refer to any sample including a biomolecule (such as a protein, a peptide, a cells acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological specimens include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological specimens include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological specimen. In certain embodiments, the term "biological specimen" as used herein refers to a sample (such as a homogenized or liquefied sample) prepared from a tumor or a portion thereof obtained from a subject.

As used herein, the terms "biomarker" or "marker" refer to a measurable indicator of some biological state or condition. In particular, a biomarker may be a protein or peptide, e.g. a surface protein, that can be specifically stained and which is indicative of a biological feature of the cell, e.g. the cell type or the physiological state of the cell. An immune cell marker is a biomarker that is selectively indicative of a feature that relates to an immune response of a mammal. A biomarker may be used to determine how well the body responds to a treatment for a disease or condition or if the subject is predisposed to a disease or condition. In the context of cancer, a biomarker refers to a biological substance that is indicative of the presence of cancer in the body. A biomarker may be a molecule secreted by a tumor or a specific response of the body to the presence of cancer. Genetic, epigenetic, proteomic, glycomic, and imaging biomarkers can be used for cancer diagnosis, prognosis, and epidemiology. Such biomarkers can be assayed in non-invasively collected biofluids like blood or serum. Several gene and protein based biomarkers have already been used in patient care including but, not limited to, AFP (Liver Cancer), BCR-ABL (Chronic Myeloid Leukemia), BRCA1/BRCA2 (Breast/Ovarian Cancer), BRAF V600E (Melanoma/Colorectal Cancer), CA-125 (Ovarian Cancer), CA19.9 (Pancreatic Cancer), CEA (Colorectal Cancer), EGFR (Non-small-cell lung carcinoma), HER-2 (Breast Cancer), KIT (Gastrointestinal stromal tumor), PSA (Prostate Specific Antigen), S100 (Melanoma), and many others. Biomarkers may be useful as diagnostics (to identify early stage cancers) and/or prognostics (to forecast how aggressive a cancer is and/or predict how a subject will respond to a particular treatment and/or how likely a cancer is to recur).

As used herein, the terms "image," "image scan," or "scanned image" encompasses raw image data acquired from the biological tissue sample, such as by means of an optical sensor or sensor array, or pre-processed image data. In particular, the image data may comprise a pixel matrix.

As used herein, the term "image data" encompasses raw image data acquired from the biological tissue sample, such as by means of an optical sensor or sensor array, or pre-processed image data. In particular, the image data may comprise a pixel matrix.

As used herein, the term "immunohistochemistry" refers to a method of determining the presence or distribution of an antigen in a sample by detecting interaction of the antigen with a specific binding agent, such as an antibody. A sample is contacted with an antibody under conditions permitting antibody-antigen binding. Antibody-antigen binding can be detected by means of a detectable label conjugated to the antibody (direct detection) or by means of a detectable label conjugated to a secondary antibody, which binds specifically to the primary antibody (indirect detection).

As used herein, the terms "multi-channel image" or "multiplex image" encompasses a digital image obtained from a biological tissue sample in which different biological structures, such as nuclei, cells, and tissue structures, are simultaneously stained with specific fluorescent dyes, quantum dots, chromogens, etc., each of which fluoresces or are otherwise detectable in a different spectral band thus constituting one of the channels of the multi-channel image.

As used herein, the term "slide" refers to any substrate (e.g., substrates made, in whole or in part, glass, quartz, plastic, silicon, etc.) of any suitable dimensions on which a biological specimen is placed for analysis, and more particularly to a "microscope slide" such as a standard 3 inch by 1 inch microscope slide or a standard 75 mm by 25 mm microscope slide. Examples of biological specimens that can be placed on a slide include, without limitation, a cytological smear, a thin tissue section (such as from a biopsy), and an array of biological specimens, for example a tissue array, a cellular array, a DNA array, an RNA array, a protein array, or any combination thereof. Thus, in one embodiment, tissue sections, DNA samples, RNA samples, and/or proteins are placed on a slide at particular locations. In some embodiments, the term slide may refer to SELDI and MALDI chips, and silicon wafers.

Overview

Despite recent success, modern computer vision techniques, such as Convolutional Neural Networks (CNNs), are expensive to apply to cell-level prediction problems in cancer histology images due to difficulties in providing cell level supervision. The present disclosure provides systems and methods which facilitate ground truth labeling for cell classification by using, in some embodiments, deep learning to detect cells in large images of biological specimens, and using the learned representations of detected cells to cluster them into homogeneous subsets, thereby reducing the burden of ground truth labeling from an order of the number of cells in the dataset to the number of identified clusters in the dataset. In some embodiments, the present disclosure provides systems and methods for the detection of cells in images of biological specimens (e.g. histology images, cytology images) using models trained on small annotated patches, and where the systems and methods further utilize neural network representations of detected cells to cluster and/or classify them. Applicant has unexpectedly discovered that even with a small training image set, the proposed systems and methods can achieve superior cell detection and classification performance, and even generalize to unseen stain types. Indeed, Applicant demonstrates the ability of the developed model to detect cells in datasets with mixed sizes and resolutions and demonstrates the ability of the developed model to generalize to stain types that it has not seen during training.

The unified deep learning classification and detection framework embodiments described herein have therefore multiple advantages over previously used approaches. For example, the embodiments described herein have a number of 'ease of use' and cost advantages. In one such example, the embodiments described herein significantly reduce the burden on the user to annotate cells at the pixel level for the detection network to learn. In other words, the embodiments described herein enable bounding box labeling for detection, which significantly reduces user annotation burden. In this manner, the embodiments provide 'ease of use' for annotation, training, and testing.

In some embodiments, the present disclosure describes systems and methods of tuning a pre-trained neural network, e.g. a convolutional neural network, with a plurality of training images to provide a tuned convolutional neural network. In some embodiments, the training images used to tune the pre-trained network are images of biological specimens stained for the presence of one or more biomarkers. In some embodiments, the training images include one or more class labels. In other embodiments, the training images include no class labels. The present disclosure also provides for a trained object detection engine which includes the tuned neural network and a region proposal network. As described herein, the trained object detection engine may be used to detect cells.

In some embodiments, the present disclosure relates to systems and methods for detecting (and optionally classifying) cells in a sample image using a trained object detection engine. In some embodiments, the systems and methods described herein facilitate the clustering of the detected cells in the sample image so as to provide one or more homogeneous clusters of detected cells in each sample image. The identified homogenous clusters of the detected cells in each sample image may be further annotated, such as by a pathologist, and such annotations may be used, in some embodiments, to train a classifier or neural network. Said another way, the annotated homogeneous clusters can be used as ground truth data.

In some embodiments, the present disclosure provides automated systems and methods for using a cell detection and classification engine to detect and/or classify cells within a test image (e.g. an unlabeled image of a biological specimen derived from a subject, e.g. a human patient) where the cell detection and classification engine is trained using ground truth data. In some embodiments, the ground truth data is derived from pathologist annotations of homogeneous clusters of detected cells in one or more sample images. In some embodiments, the cell detection and classification engine comprises a neural network, e.g. a different neural network than that encompassed with the object detection engine described above.

At least some embodiments of the present disclosure relate to computer systems and methods for analyzing digital images captured from biological specimens, including tissue samples, stained with one or more primary stains (e.g. hematoxylin and eosin (H&E)) and one or more detection probes (e.g. probes containing a specific binding entity which facilitates the labeling of targets within the sample). While examples herein may refer to specific tissues and/or the application of specific stains or detection probes for the detection of certain markers, the skilled artisan will appreciate that different tissues and different stains/detection probes may be applied to detect different markers.

A digital pathology system 200 for imaging and analyzing specimens is illustrated in FIGS. 1 and 2A-2C. The digital pathology system 200 may comprise an imaging apparatus 12 (e.g. an apparatus having means for scanning a specimen-bearing microscope slide) and a computer 14, whereby the imaging apparatus 12 and computer may be communicatively coupled together (e.g. directly, or indirectly over a network 20). The computer system 14 can include a desktop computer, a laptop computer, a tablet, or the like, digital electronic circuitry, firmware, hardware, memory 201, a computer storage medium (240), a computer program or set of instructions (e.g. where the program is stored within the memory or storage medium), one or more processors (209) (including a programmed processor), and any other hardware, software, or firmware modules or combinations thereof (such as described further herein). For example, the computing system 14 illustrated in FIG. 1 may comprise a computer with a display device 16 and an enclosure 18. The computer system can store digital images in binary form (locally, such as in a memory, on a server, or another network connected device). The digital images can also be divided into a matrix of pixels. The pixels can include a digital value of one or more bits, defined by the bit depth. The skilled artisan will appreciate that other computer devices or systems may be utilized and that the computer systems described herein may be communicatively coupled to additional components, e.g. specimen analyzers, microscopes, other imaging systems, automated slide preparation equipment, etc. Some of these additional components and the various computers, networks, etc. that may be utilized are described further herein.

In general, the imaging apparatus 12 (or other image source including pre-scanned images stored in a memory) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multispectral imaging (MSI) system or a fluorescent microscopy system. The digitized tissue data may be generated, for example, by an image scanning system, such as a VENTANA DP200 scanner by VENTANA MEDICAL SYSTEMS, Inc. (Tucson, Arizona) or other suitable imaging equipment. Additional imaging devices and systems are described further herein. The skilled artisan will appreciate that the digital color image acquired by the imaging apparatus 12 is conventionally composed of elementary color pixels. Each colored pixel can be coded over three digital components, each comprising the same number of bits, each component corresponding to a primary color, generally red, green or blue, also denoted by the term "RGB" components.

Figure 2A:
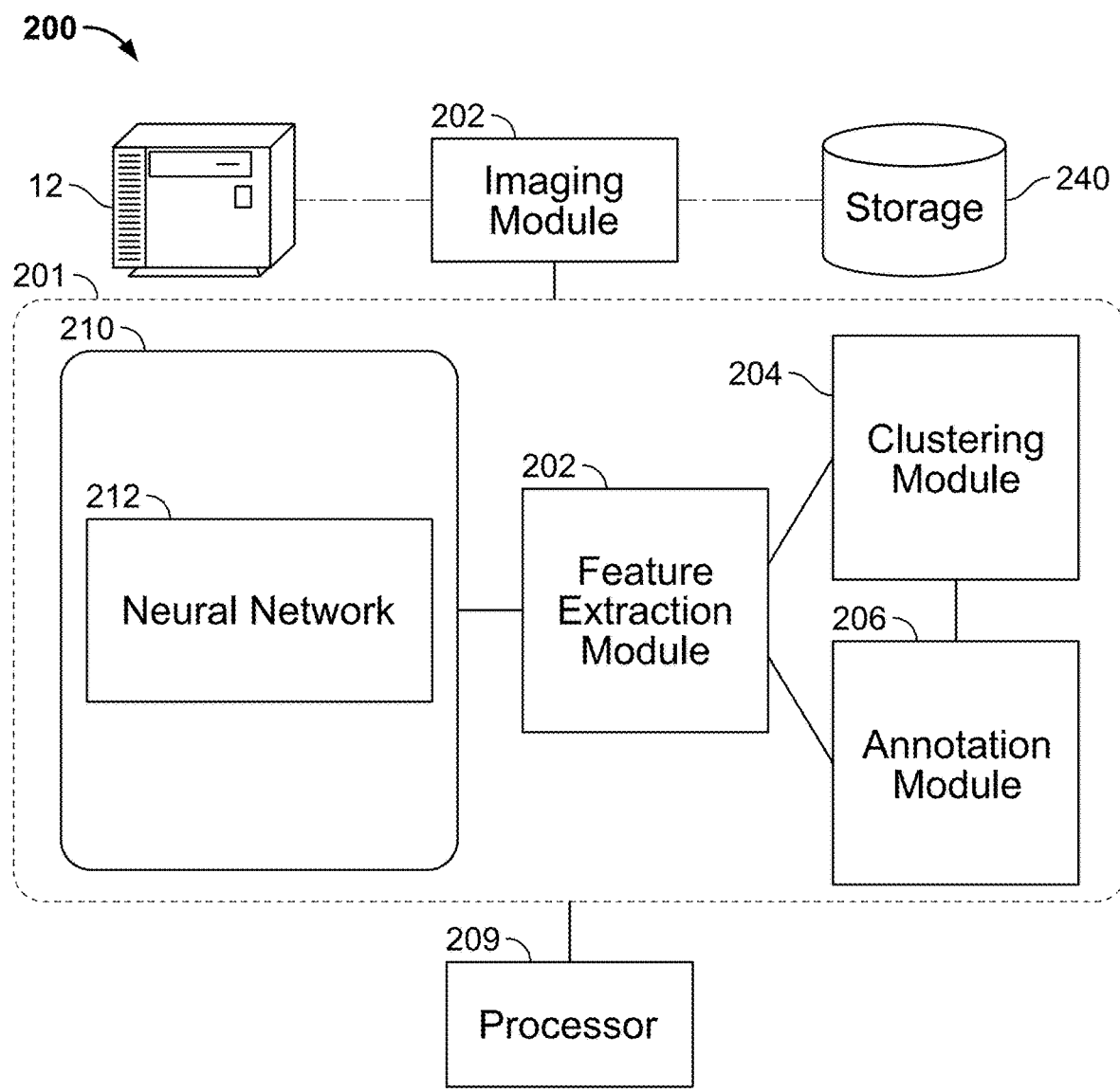
FIG. 2A sets forth various modules that can be utilized in a digital pathology system or within a digital pathology workflow to detect cells in a sample image in accordance with one embodiment of the present disclosure.
Figure 2B:
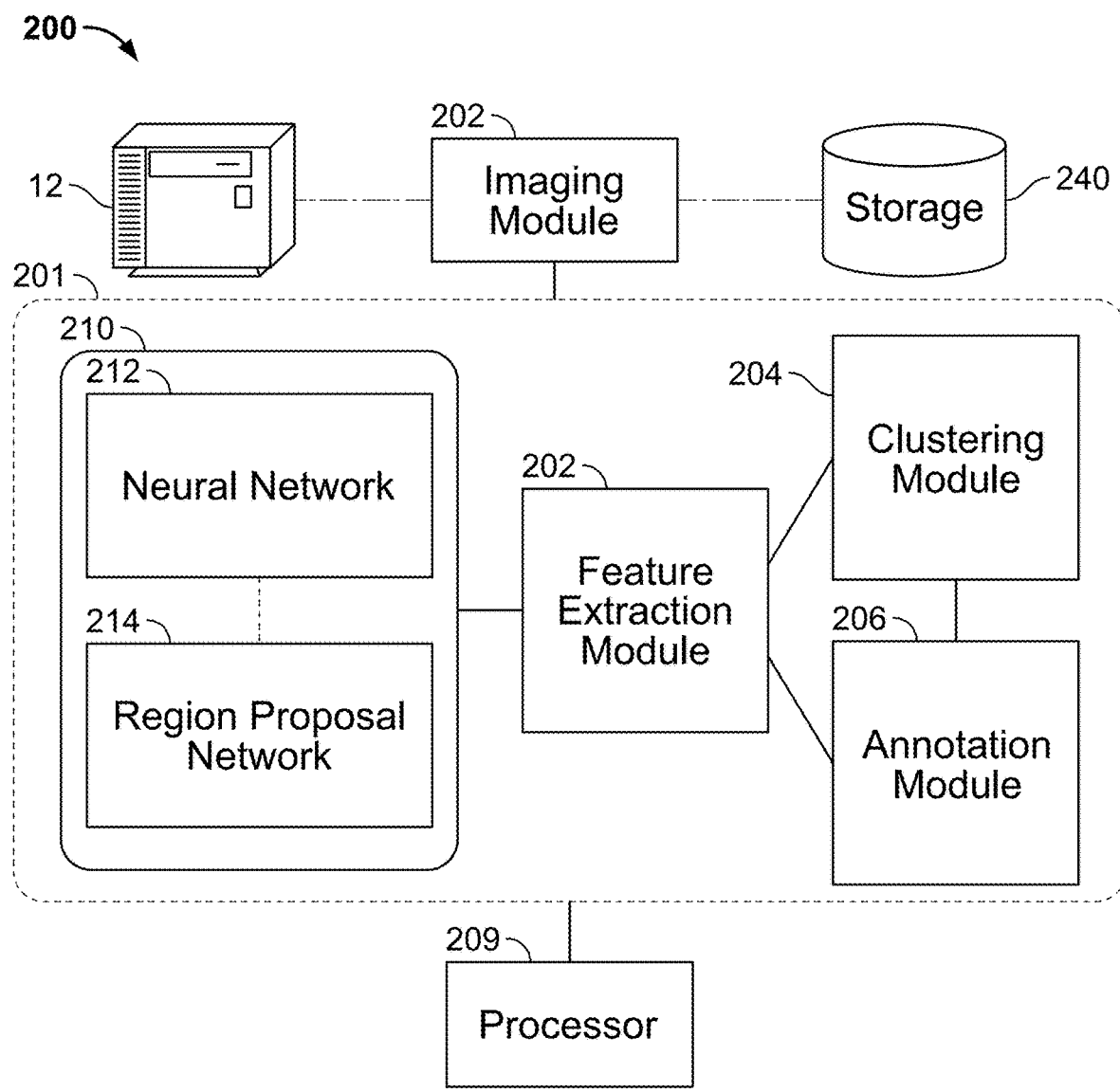
FIG. 2B sets forth various modules that can be utilized in a digital pathology system or within a digital pathology workflow to detect cells in a sample image in accordance with one embodiment of the present disclosure.
Figure 2C:
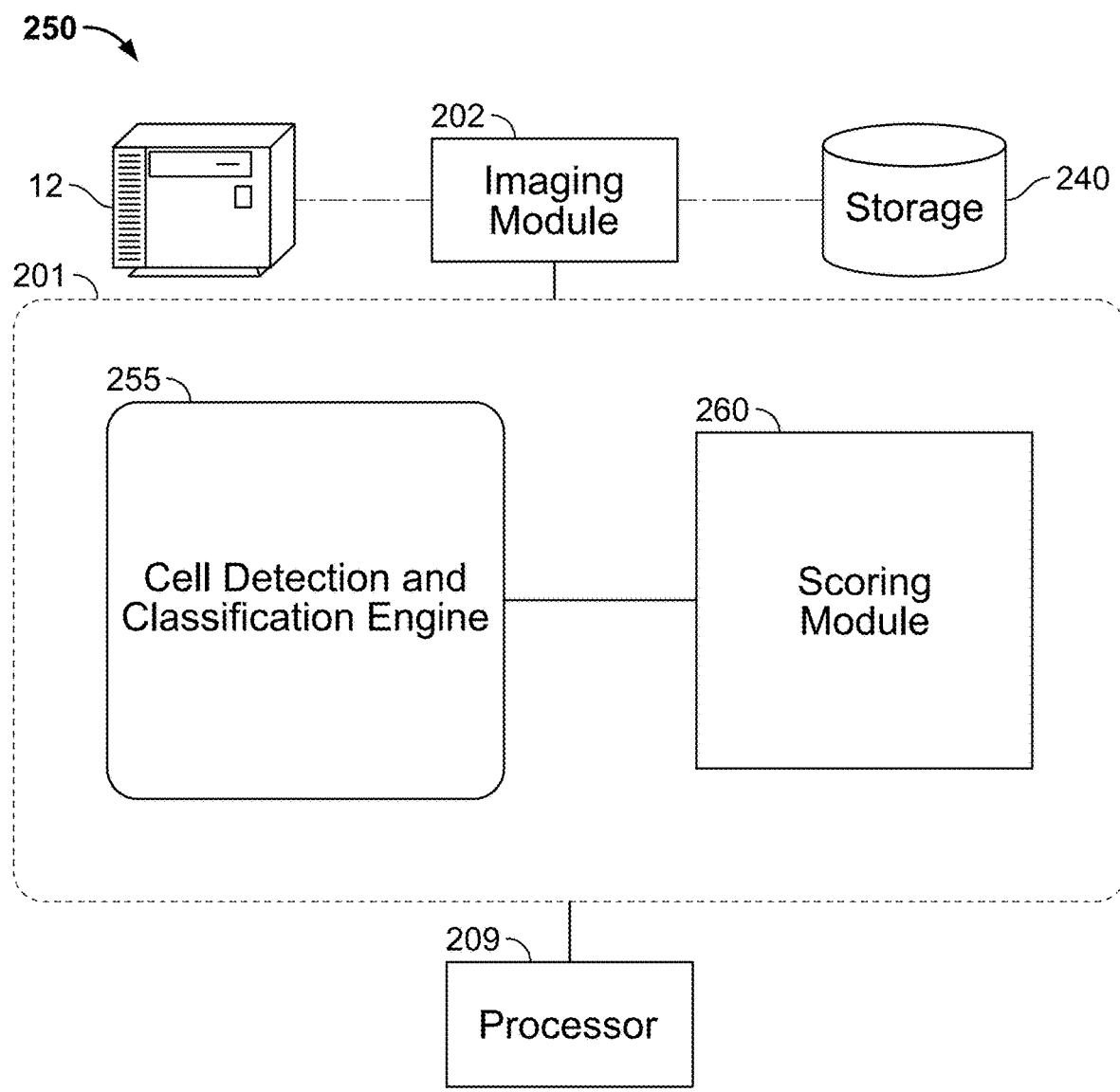
FIG. 2C sets forth various modules that can be utilized in a digital pathology system or within a digital pathology workflow to detect and/or classify cells in a test image in accordance with one embodiment of the present disclosure.

FIGS. 2A-2C provide overviews of systems 200 and 250 of the present disclosure and the various modules utilized within each system. In some embodiments, the two digital pathology systems 200 and 250 employ a computer device or computer-implemented method having one or more processors 209 and one or more memories 201, the one or more memories 201 storing non-transitory computer-readable instructions for execution by the one or more processors to cause the one or more processors to execute certain instructions as described herein.

Figure 4:
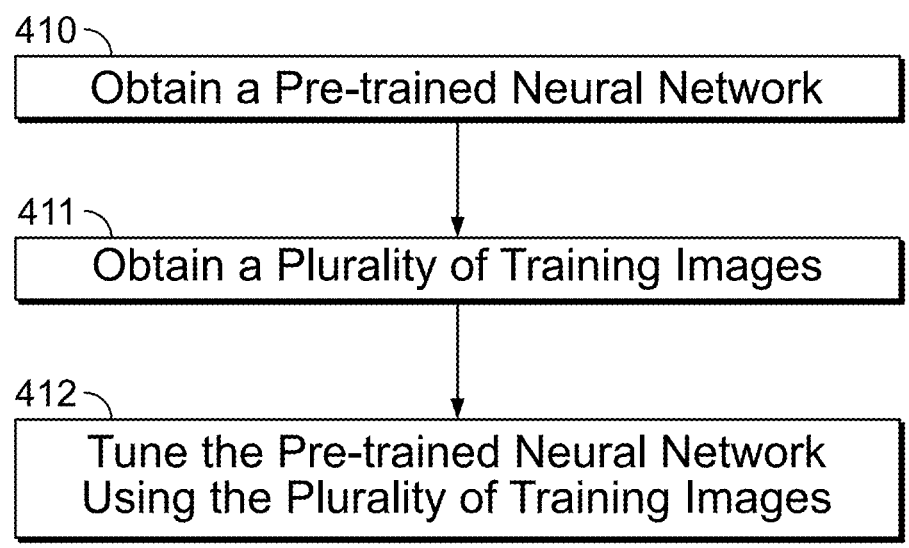
FIG. 4 provides a flow chart illustrating the steps of tuning a pre-trained neural network in accordance with one embodiment of the present disclosure.

The systems 200 depicted in FIGS. 2A and 2B each include an object detection engine 210 which may be trained to detect (and optionally classify) cells in a sample image. The systems 200 also include components such that homogeneous clusters of detected cells may be identified. In some embodiments, the object detection engine comprises a neural network 212. In some embodiments, the object detection engine 210 includes a first portion comprising a neural network 212 and a second portion comprising a region proposal network 214 (see FIG. 2B). In some embodiments, the object detection engine 210 comprises an architecture derived from a region-based convolutional neural network. In some embodiments, the neural network 212 may be operated independently from the region proposal network 214. For example, the neural network 212 may be trained as described herein (see also FIG. 4). Once the neural network 212 is trained, the trained neural network 212 may be used in conjunction with the region proposal network 214 for detecting and/or classifying cells in an input image.

In some embodiments, the systems are adapted for detecting and optionally classifying cells in a sample image. With reference to FIGS. 2A, 2B, 3A, and 3B, in some embodiments, one or more sample images are received from either the imaging apparatus 12 or the storage module 240. In some embodiments, the sample images are stained with a primary stain or stained for the presence of one or more biomarkers, e.g. hematoxylin, DAPI, DAB, etc. In some embodiments, an object detection engine 210 is used to detect and optionally classify cells within the received sample images (step 310). In some embodiments, the object detection engine comprises a neural network 212, e.g. a convolutional neural network, and a region proposal network 214. In some embodiments, the neural network 212 is used to identify cellular features in the received sample images (step 340). In some embodiments, the region proposal network 214 is used to detect cells (step 341) in the received sample images based on the cellular features identified by the neural network 212. After the cells are detected, a feature extraction module 202 is used to extract at least a portion of the identified cellular features (steps 311 or 341) from at least one of the layers of the network 212. Based on the extracted cellular features, a clustering module 204 may subsequently be used to generate homogeneous clusters of cells (steps 312 or 342). The generated homogeneous clusters may then be annotated, such as by a pathologist using an annotation module 206. In some embodiments, the pathologist annotations may be used as ground truth data, where the ground truth data may be used to train a classifier (e.g. a support vector machine), or another separate neural network (where the separate neural network may be the same type as in the object detection engine 212 or different); or may be used to fine-tune the trained neural network 212 of object detection engine 210.

FIG. 2C provides an overview of the modules used in a system 250 to detect and/or classify cells in a test image. In some embodiments, the system 250 includes a cell detection and classification module 255. In some embodiments, the cell detection and classification module comprises a neural network. In some embodiments, the cell detection and classification module comprises a classifier, e.g. a support vector machine. In embodiments where the cell detection and classification module comprises a neural network, the neural network may the same or different than the neural network 212 of the object detection engine 210. In some embodiments, the system 250 also includes a scoring module to score the detected and/or classified cells, e.g. to determine an H-score or a percent positivity.

The skilled artisan will also appreciate that additional modules may be incorporated into the workflow or into systems 200 and 250. In some embodiments, an image processing or pre-processing module may be run to apply certain filters to the acquired images or to identify certain histological and/or morphological structures or features within the tissue samples. Likewise, a region of interest selection module may be utilized to select a particular portion of a sample image or test for analysis. In addition, an unmixing module may be run to unmixing multiplex images prior to further processing.

Image Acquisition Module

With reference to FIGS. 2A-2C, in some embodiments, the digital pathology systems 200 and 250 run an image acquisition module 202 to capture images (e.g. using an imaging apparatus 12) of a biological specimen, including those biological specimens having one or more stains, e.g. primary stains, or stains indicative of the presence of a biomarker. In some embodiments, the images are simplex images. In other embodiments, the images are multiplex images. In some embodiments, the images received or acquired are RGB images or multispectral images. In some embodiments, the images captured are stored in memory 201 (or within a storage module 240).

In some embodiments, the acquired images or the images stored in storage module 240 are "training images." In some embodiments, the training images are images of biological specimens, and may be histological specimens or cytological specimens, or any combination thereof. In some embodiments, the training images are used to tune a pre-trained neural network. In this regard, the training images are used for a training purpose. In some embodiments, the training images comprise at least one stain. In some embodiments, the training images comprise multiple stains. In some embodiments, the training images include one or more class annotations. In some embodiments, a plurality of training images are used to tune a pre-trained neural network. In some embodiments, the training images may be part of a dataset comprising a plurality of training images, where each of the training images of the plurality of training images may comprise the same or different stains, and where each of the training images of the plurality of training images may include class labels.

In some embodiments, the acquired images or the images stored in the storage module 240 are "sample images." In some embodiments, the sample images are images of biological specimens, and may be histological specimens or cytological specimens. In some embodiments, the sample images are supplied to the trained neural network such that cells may be detected (and optionally classified) and such that the detected cells may be clustered (see, for example, FIG. 7). It is from the sample images that ground truth data may ultimately be derived, i.e. where the ground truth data includes pathologist annotations of generated homogeneous clusters of detected cells in sample images. The generated ground truth data may be used to train a classifier or neural network.

In some embodiments, the acquired images or the images stored in the storage module 240 are "test images." In some embodiments, the test images are images of biological specimens, and may be histological specimens or cytological specimens. The test images are supplied to a trained classifier or neural network, such as one that has been trained using the generated ground truth data, including pathologist annotations, as noted above. In this way, cells within the test images may be detected and/or classified. The test images can be thought of as images of samples derived from a subject, e.g. a human patient, where a pathological impression or a diagnosis may be reached based on the detection and/or classification of cells (or other cellular features) within the test image.

Any of the training images, sample images, or the test images (collective referred to herein as "input images") may be of a whole slide image or any portion thereof (e.g. a predetermined field-of-view). Moreover, and regardless of whether the images are training images, sample images, or test images, the input images may be acquired through the use of any imaging apparatus. The input images may be acquired using the imaging apparatus 12, such as in real-time. In some embodiments, the input images are acquired from a microscope or other instrument capable of capturing image data of a specimen-bearing microscope slide, as noted herein. In some embodiments, the input images are acquired using a 2D scanner, such as one capable of scanning image tiles, or a line scanner capable of scanning the image in a line-by-line manner, such as the VENTANA DP 200 scanner.

The camera platform may also include a bright field microscope, one example being the VENTANA iScan HT product of Ventana Medical Systems, Inc., or any microscope having one or more objective lenses and a digital imager, as well as a set of spectral filters. Other techniques for capturing images at different wavelengths may be used. Further camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure.

In general, the input images each comprise signals corresponding to a stain (including chromogens, fluorophores, quantum dots, etc.). In some embodiments, the input images have been stained with at least one primary stain (hematoxylin or eosin). In other embodiments, the at least one image has been stained in at least one of an IHC assay or ISH assay for the identification of a specific biomarker (referred to herein as a "biomarker" image). In some embodiments, multiple simplex images are used as input, and those images may be derived from serial tissue sections, i.e. serial sections derived from the same xenograft tissue block. In some embodiments, the input images may be multiplex images, i.e. stained for multiple, different markers in a multiplex assay according to methods known to those of ordinary skill in the art.

A typical biological specimen is processed in a staining/assay platform that applies a stain to the sample. In some embodiments, specimen processing apparatus is an automated apparatus, such as the BENCHMARK XT instrument, the SYMPHONY instrument, the BENCHMARK ULTRA instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

Examples of commercially available H&E stainers include the VENTANA SYMPHONY (individual slide stainer) and VENTANA HE 600 (individual slide stainer) series H&E stainers from Roche; the Dako CoverStainer (batch stainer) from Agilent Technologies; the Leica ST4020 Small Linear Stainer (batch stainer), Leica ST5020 Multistainer (batch stainer), and the Leica ST5010 Autostainer XL series (batch stainer) H&E stainers from Leica Biosystems Nussloch GmbH. Other commercial products on the market suitable for use as the staining/assay platform, one example being the Discovery™ product of Ventana Medical Systems, Inc. (Tucson, AZ).

As the skilled artisan will appreciate, a biological specimen may be stained for different types of and/or cell membrane biomarkers. Methods for staining tissue structures and guidance in the choice of stains appropriate for various purposes are discussed, for example, in "Sambrook et al., Molecular Cloning: A Laboratory Manual, Cold Spring Harbor Laboratory Press (1989)" and "Ausubel et al., Current Protocols in Molecular Biology, Greene Publishing Associates and Wiley-Intersciences (1987)," the disclosures of which are incorporated herein by reference.

By way of one non-limiting example, and in the context of detecting breast cancer, in some embodiments the tissue sample is stained in an IHC assay for the presence of one or biomarkers including an estrogen receptor marker, a progesterone receptor marker, a Ki-67 marker, or a HER2 marker. As such, in some embodiments, the biomarker image used as an input is an IHC image which comprises signals (the signals corresponding to stains which may be, for example, chromogenic or fluorescent) corresponding to a presence of at least one of an estrogen receptor (ER) marker, a progesterone receptor (PR) marker, a Ki-67 marker, or a HER2 marker. In some embodiments, the sample can be analyzed to detect or measure the presence of ER, HER2, Ki-67 and PR proteins in the sample, for example a qualitative or quantitative measurement. By way of another non-limiting example, and in the context of detecting non-small cell lung cancer, in some embodiments the tissue sample is stained in an IHC assay for the presence of one or biomarkers including a PD-L1 biomarker. As such, in some embodiments, the biomarker image used as an input is an IHC image which comprises signals corresponding to a presence of a PD-L1 marker, CD3 marker and CD8 marker.

Whether the images acquired will be used as training images or sample images for ground truthing; or as test images for cell detection and/or classification, the input images may include information that needs to be masked. In some embodiments, the input images are optionally masked with a tissue masking module as described herein. In some embodiments, the input images are masked such that only tissue regions are present in the images. In some embodiments, a tissue region mask is generated to mask non-tissue regions from tissue regions. In some embodiments, a tissue region mask may be created by identifying the tissue regions and automatically or semi-automatically (i.e., with minimal user input) excluding the background regions (e.g. regions of a whole slide image corresponding to glass with no sample, such as where there exists only white light from the imaging source).

The skilled artisan will appreciate that in addition to masking non-tissue regions from tissue regions, the tissue masking module may also mask other areas of interest as needed, such as a portion of a tissue identified as belonging to a certain tissue type or belonging to a suspected tumor region. In some embodiments, a segmentation technique is used to generate the tissue region masked images by masking tissue regions from non-tissue regions in the input images. Suitable segmentation techniques are as such known from the prior art, (cf. Digital Image Processing, Third Edition, Rafael C. Gonzalez, Richard E. Woods, chapter 10, page 689 and Handbook of Medical Imaging, Processing and Analysis, Isaac N. Bankman Academic Press, 2000, chapter 2). Additional information and examples pertaining to the generation of tissue region masks is disclosed in PCT/EP/2015/062015, entitled "An Image Processing Method and System for Analyzing a Multi-Channel Image Obtained from a Biological Tissue Sample Being Stained by Multiple Stains," the disclosure of which is hereby incorporated by reference herein in its entirety.

Object Detection Engine

The systems 200 of the present disclosure include an object detection engine 210 including at least a neural network 212. In some embodiments, the object detection engine 210 comprises a first portion comprising a neural network 212 (including any of the neural networks described below) and a region proposal network 214. In some embodiments, a trained object detection engine 210, i.e. one including a trained neural network 212, is used to detect and/or classify cells in sample images such that homogeneous clusters of cells may be identified in the sample images. In some embodiments the neural network 212 is configured to determine features and generate a feature map for sample images. In some embodiments, the object detection engine 210 comprises an architecture derived from a region-based convolutional neural network as described below.

Object detection is the process of finding and classifying objects in an image. One deep learning approach, region-based convolutional neural networks (RCNN), combines rectangular region proposals with convolutional neural network features (described herein). RCNN is a two-stage detection algorithm. The first stage identifies a subset of regions in an image that might contain an object. The second stage classifies the object in each region. Models for object detection using regions with CNNs are based on the following three processes: (a) find regions in the image that might contain an object. These regions are called region proposals; (b) extract CNN features from the region proposals; and (c) classify the objects using the extracted features.

Figure 6A:
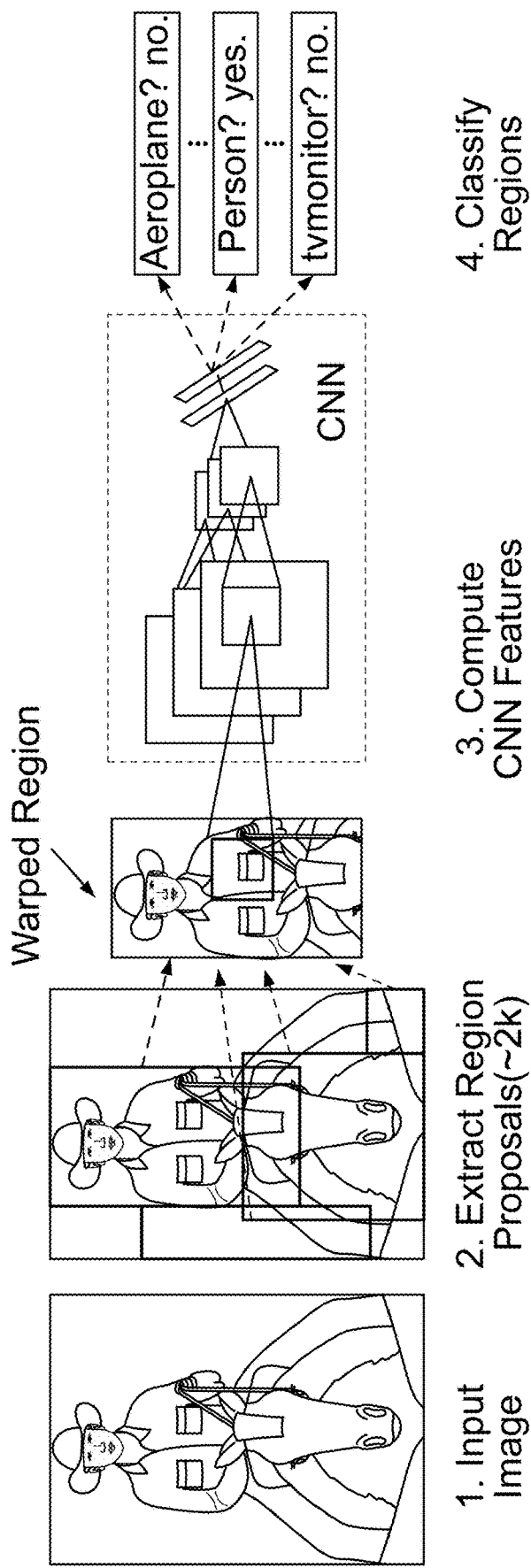
FIG. 6A provides an overview of the methodology of a region-based convolutional neural network RCNN) in accordance with one embodiment of the present disclosure.

There are several variants of an RCNN. Each variant attempts to optimize, speed up, or enhance the results of one or more of these processes. The RCNN detector (Girshick, R., J. Donahue, T. Darrell, and J. Malik. "Rich Feature Hierarchies for Accurate Object Detection and Semantic Segmentation." CVPR '14 Proceedings of the 2014 IEEE Conference on Computer Vision and Pattern Recognition. Pages 580-587, 2014) first generates region proposals using an algorithm such as Edge Boxes (Zitnick, C. Lawrence, and P. Dollar. "Edge boxes: Locating object proposals from edges." Computer Vision-ECCV. Springer International Publishing. Pages 391-4050. 2014). The proposal regions are cropped out of the image and resized. Then, the CNN classifies the cropped and resized regions. Finally, the region proposal bounding boxes are refined by a support vector machine (SVM) that is trained using CNN features. FIG. 6A illustrates the process of region detection, the computation of CNN features, and the classification of regions.

Figure 6B:
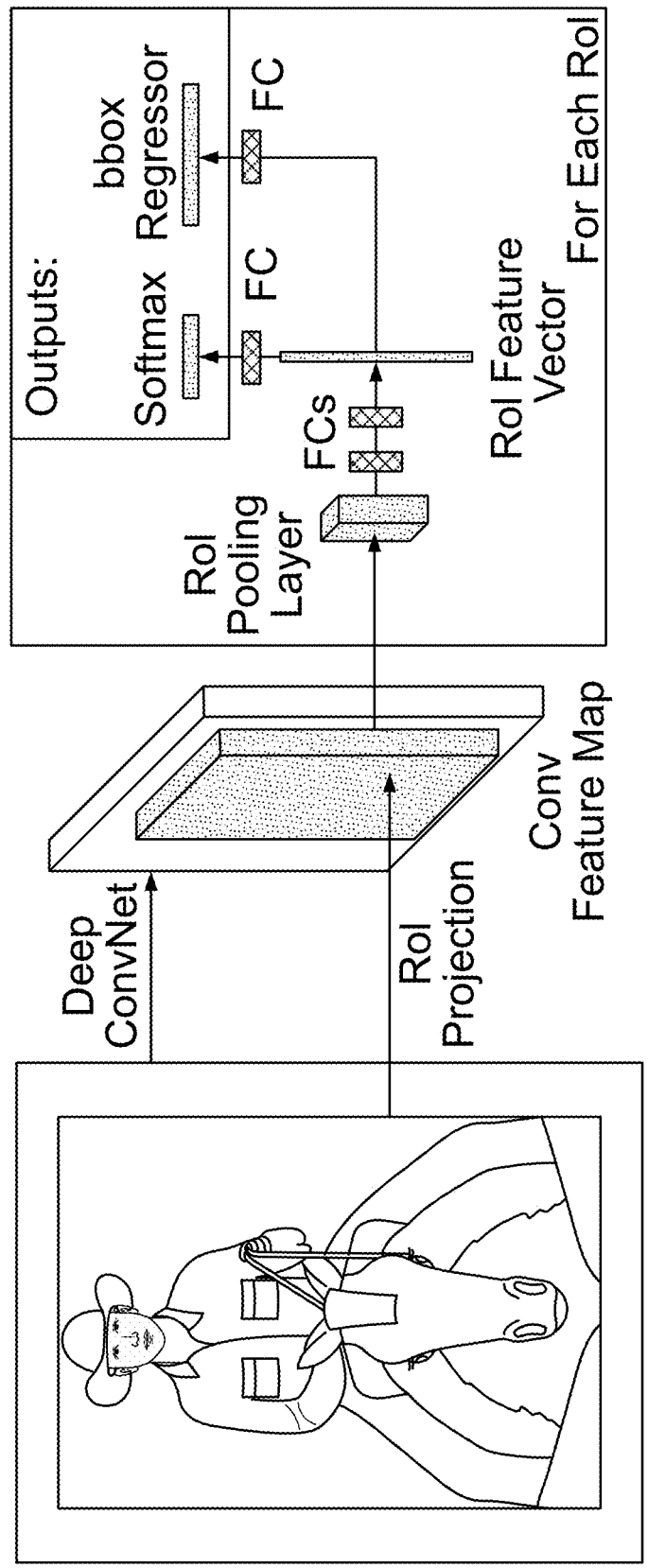
FIG. 6B provides an overview of the methodology of a Fast-RCNN in accordance with one embodiment of the present disclosure.

As in the RCNN detector, the Fast RCNN detector (Girshick, Ross. "Fast RCNN." Proceedings of the IEEE International Conference on Computer Vision. 2015) also uses an algorithm like Edge Boxes to generate region proposals. Unlike the RCNN detector, which crops and resizes region proposals, the Fast RCNN detector processes the entire image. Whereas an RCNN detector must classify each region, Fast RCNN pools CNN features corresponding to each region proposal. Fast RCNN is more efficient than RCNN, because in the Fast RCNN detector, the computations for overlapping regions are shared. FIG. 6B illustrates detection using a convolutional feature map and a region of interest (ROI) feature vector.

Figure 6C:
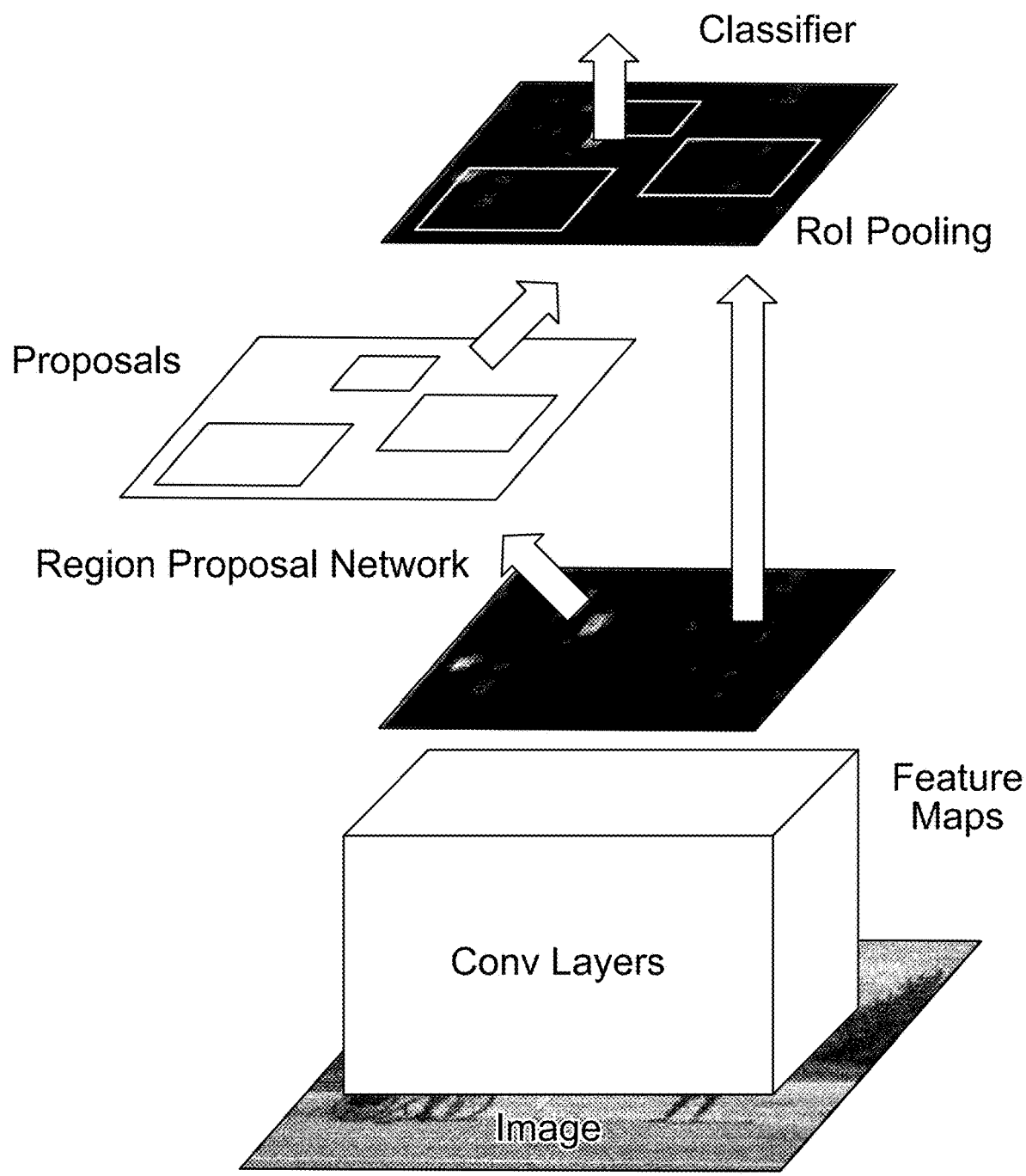
FIG. 6C provides an overview of the methodology of a Faster-RCNN in accordance with one embodiment of the present disclosure.

The Faster RCNN detector is described by Ren, Shaoqing, Kaiming He, Ross Girshick, and Jian Sun. "Faster RCNN: Towards Real-Time Object Detection with Region Proposal Networks." Advances in Neural Information Processing Systems, Vol. 28, 2015. Instead of using an external algorithm like Edge Boxes, Faster RCNN adds a region proposal network 214 to generate region proposals directly in the network. The region proposal network uses Anchor Boxes for Object Detection. It is believed that generating region proposals in the network allows faster and more efficient detection of cells in sample images, especially given the large sizes of the input images provided to the object detection engine 210. In some embodiments, the region proposal network and the classification network share the same feature extraction layers. FIG. 6C illustrates an object detection engine 210 based on a Faster-RCNN architecture, the object detection engine 210 including a plurality of convolutional layers and a region proposal network.

Mask-RCNN, extends Faster R-CNN by adding a branch for predicting an object mask in parallel with the existing branch for bounding box recognition. Mask-RCNN refines the step of the ROI pooling. In the ROI, the warping is digitalized and the cell boundaries of the target feature map are forced to realign with the boundary of the input feature maps. Mask-RCNN uses ROI Align which does not digitalize the boundary of the cells and makes every target cell have the same size. It also applies interpolation to calculate the feature map values.

Specific implementations of RCNNs, including Fast-RCNN and Faster-RCNN, are described in United States Publication Nos. 2018/0268292, 2018/0018535, and 2016/034288, the disclosures of which are each hereby incorporated by reference herein in their entireties. Yet other specific implementations of RCNNs, including Fast-RCNN and Faster-RCNN, are described in U.S. Pat. No. 9,971,953, the disclosure of which is incorporated by reference herein in its entirety. Any of these implementations may be adapted to detect and/or classify cells.

A region proposal network 214 can be generally defined as a fully convolutional network that detects objects in images and proposes regions corresponding to those detected objects. Proposal networks are attractive for use in the embodiments described herein because they are relatively fast and are able to detect objects of different size. The proposal network may overlay a sliding window on the feature map generated by one or more convolutional layers generating k anchor boxes. The results of overlaying the sliding window on the feature map may be input to an intermediate layer of the proposal network, which may generate 2 k scores via a cls layer and 4 k coordinates via a reg layer (see Ren, Shaoqing, Kaiming He, Ross Girshick, and Jian Sun. "Faster RCNN: Towards Real-Time Object Detection with Region Proposal Networks." Advances in Neural Information Processing Systems, Vol. 28, 2015).

In some embodiments, the region proposal network 214 is configured for cell detection. In other words, the region proposal network 214 uses features from the generated feature map to detect the cells in the sample images based on the determined features. In some embodiments, the region proposal network 214 is configured to generate bounding box detection results.

Neural Networks

In some embodiments, the present disclosure is directed to training a neural network 212, such as a convolutional neural network, and then utilizing that trained neural network to detect and/or classify cells in input images. Suitable neural networks which may be trained and/or used in the detection and/or classification of cells are described below.

In some embodiments, the neural network 212 is configured as a deep learning network. In general, "deep learning" is a branch of machine learning based on a set of algorithms that attempt to model high level abstractions in data. Deep learning is part of a broader family of machine learning methods based on learning representations of data. An observation (e.g., an input image) can be represented in many ways such as a vector of intensity values per pixel, or in a more abstract way as a set of edges, regions of particular shape, etc. Some representations are better than others at simplifying the learning task. One of the promises of deep learning is replacing handcrafted features with efficient algorithms for unsupervised or semi-supervised feature learning and hierarchical feature extraction.

In some embodiments, the neural network 212 is a machine learning network. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that gives computers the ability to learn without being explicitly programmed. Machine learning explores the study and construction of algorithms that can learn from and make predictions on data—such algorithms overcome following strictly static program instructions by making data driven predictions or decisions, through building a model from sample inputs. The machine learning described herein may be further performed as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)," Hand et al., MIT Press, 2001, 578 pages; which are incorporated by reference as if fully set forth herein. The embodiments described herein may be further configured as described in these references.

In some embodiments, the neural network 212 is a generative network. A "generative" network can be generally defined as a model that is probabilistic in nature. In other words, a "generative" network is not one that performs forward simulation or rule-based approaches. Instead, the generative network can be learned (in that its parameters can be learned) based on a suitable training set of data (e.g. from a plurality of training images, such as training images of biological specimens stained for the presence of one or more biomarkers). In some embodiments, the neural network is configured as a deep generative network. For example, the network may be configured to have a deep learning architecture in that the network may include multiple layers, which perform a number of algorithms or transformations.

In some embodiments, the neural network 212 may be a deep neural network with a set of weights that model the world according to the data that it has been fed to train it, such as described herein. Neural networks typically consist of multiple layers, and the signal path traverses from front to back between the layers. Any neural network may be implemented for this purpose. Suitable neural networks include the LeNet proposed by Yann LeCun; the AlexNet proposed by Alex Krizhevsky et al.; the ZF Net proposed by Matthew Zeiler et al.; the GoogLeNet proposed by Szegedy et al.; the VGGNet proposed by Karen Simonyan et al.; and the ResNet proposed by Kaiming He et al. In some embodiments, the neural network is VGG16 (Simonyan, 2014). In other embodiments, the multilayer neural network is DenseNet (see Huang et al., "Densely Connected Convolutional Networks," arXiv:1608.06993). In some embodiments, a fully convolutional neural network is utilized, such as described by Long et al., "Fully Convolutional Networks for Semantic Segmentation," Computer Vision and Pattern Recognition (CVPR), 2015 IEEE Conference, June 20015 (INSPEC Accession Number: 15524435), the disclosure of which is hereby incorporated by reference.

In some embodiments, the neural network 212 is configured as an AlexNet. For example, the classification network structure can be AlexNet. The term "classification network" is used herein to refer to a CNN, which includes one or more fully connected layers. In general, an AlexNet includes a number of convolutional layers (e.g., 5) followed by a number of fully connected layers (e.g., 3) that are, in combination, configured and trained to classify images. Examples of neural networks configured as AlexNets are described in "ImageNet Classification with Deep Convolutional Neural Networks" by Krizhevsky et al., NIPS 2012, which is incorporated by reference as if fully set forth herein. The neural networks described herein may be further configured as described in this reference.

In other embodiments, the neural network 212 is configured as a GoogleNet. For example, the classification network structure can be GoogleNet. A GoogleNet may include layers such as convolutional, pooling, and fully connected layers such as those described further herein configured and trained to classify images. While the GoogleNet architecture may include a relatively high number of layers (especially compared to some other neural networks described herein), some of the layers may be operating in parallel, and groups of layers that function in parallel with each other are generally referred to as inception modules. Other of the layers may operate sequentially. Therefore, a GoogleNet is different from other neural networks described herein in that not all of the layers are arranged in a sequential structure. Examples of neural networks configured as GoogleNets are described in "Going Deeper with Convolutions," by Szegedy et al., CVPR 2015, which is incorporated by reference as if fully set forth herein. The neural networks described herein may be further configured as described in this reference.

In other embodiments, the neural network 212 is configured as a VGG network. For example, the classification network structure can be VGG. VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to classify images. VGG networks also include convolutional layers followed by fully connected layers. Examples of neural networks configured as VGG are described in "Very Deep Convolutional Networks for Large-Scale Image Recognition," by Simonyan et al., ICLR 2015, which is incorporated by reference as if fully set forth herein. The neural networks described herein may be further configured as described in this reference.

In some embodiments, the neural network 212 comprises an autoencoder. An autoencoder neural network is an unsupervised learning algorithm that applies backpropagation, setting the target values to be equal to the inputs. The aim of an autoencoder is to learn a representation (encoding) for a set of data, typically for dimensionality reduction, by training the network to ignore signal "noise." Along with the reduction side, a reconstructing side is learnt, where the autoencoder tries to generate from the reduced encoding a representation as close as possible to its original input. Additional information regarding autoencoders can be found at http://ufldl.stanford.edu/tutorial/unsupervised/Autoencoders/, the disclosure of which is hereby incorporated by reference herein in its entirety.

In other embodiments, the neural network 212 is configured as a deep residual network. For example, the classification network structure can be a Deep Residual Net or ResNet. Like some other networks described herein, a deep residual network may include convolutional layers followed by fully connected layers, which are, in combination, configured and trained for image classification. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart. Examples of deep residual nets are described in "Deep Residual Learning for Image Recognition" by He et al., NIPS 2015, which is incorporated by reference as if fully set forth herein. The neural networks described herein may be further configured as described in this reference.

Tuning a Pre-Trained Neural Network

In some embodiments, the neural network 212 of the object detection engine 210 is first trained, such as with a plurality of training images or with one or more datasets comprising a plurality of training images. Neural networks are typically trained on a large and publicly available image data archives (such as ImageNet, Russakovsky et al, 2015, ImageNet Large Scale Visual Recognition Challenge. IJCV, 2015) of natural images. Given that typically the training images for biological specimens such as tumor samples are fewer, transfer learning methods are adopted.

In some embodiments, "transfer learning" methods may be used, where pre-trained networks, such as those mentioned above, along with their learnt weights are used to initialize the training process on the new set of training images, and trained to adapt the weights to the specific application at hand (see, Pan, S. J., & Yang, Q. (2010). A Survey on Transfer Learning. IEEE Transactions on Knowledge and Data Engineering, 22(10), 1345-1359. doi: 10.1109/tkde.2009.191, the disclosure of which is hereby incorporated by reference herein in its entirety). In some embodiments, the pre-trained networks are trained on existing public or private datasets that may or may not be directly related to the application of interest and may or may not be biological in nature. In some embodiments, the final layers' weights are initialized at random to avoid falling into suboptimal local minima, while in other embodiments, the final layers' weights are imported unchanged.

In some embodiments, a pre-trained neural network is obtained (step 410). In some embodiments, the pre-trained neural network is one that has been trained using a database comprising a dataset comprising a large number of images, e.g. over 100,000 images, over 200,000 images, or over 300,000 images. In some embodiments, the pre-trained neural network is one that was pre-trained using the Microsoft Coco dataset (Tsung-Yi Lin, et. al., "Microsoft coco: Common objects in context," in European conference on computer vision, Springer, 2014, pp. 740-755). In other embodiments, the pre-trained neural network is one that was pre-trained using the ImageNet dataset (J. Deng, W. Dong, R. Socher, L.-J. Li, K. Li, and L. Fei-Fei, "ImageNet: A Large-Scale Hierarchical Image Database," in CVPR, 2009), the PASCAL VOC (M. Everingham, L. Van Gool, C. K. I. Williams, J. Winn, and A. Zisserman, "The PASCAL visual object classes (VOC) challenge," IJCV, vol. 88, no. 2, pp. 303-338, June 2010), or the SUN dataset (J. Xiao, J. Hays, K. A. Ehinger, A. Oliva, and A. Torralba, "SUN database: Large-scale scene recognition from abbey to zoo," in CVPR, 2010).

The Microsoft Common Objects in Context (MS COCO) dataset contains 91 common object categories with 82 of them having more than 5,000 labeled instances. In total the dataset has 2,500,000 labeled instances in 328,000 images. In contrast to the ImageNet dataset, COCO has fewer categories but more instances per category. It is believed that this can aid in learning detailed object models capable of precise 2D localization. The dataset is also significantly larger in number of instances per category than the PASCAL VOC and SUN datasets. It is believed that MS COCO contains considerably more object instances per image (7.7) as compared to ImageNet (3.0) and PASCAL (2.3). In contrast, the SUN dataset, which contains significant contextual information, has over 17 objects and "stuff" per image but considerably fewer object instances, overall. Methods of training a neural network are further described in U.S. Publication No. 2019/0073568, the disclosure of which is hereby incorporated by reference herein in its entirety.

After the pre-trained neural network is obtained, a plurality of training images are obtained (step 411), which may be used to tune the pre-trained neural network (step 412). In order to familiarize the pre-trained model with the unique neural network with the unique characteristics of images of biological specimens, the pre-trained neural network is, in some embodiments, tuned using training images of biological specimens stained with a primary stain or stained for the presence of one or more biomarkers. By way of example only, five different training image datasets are set forth in Table 1. In some embodiments, the training images of the biological specimens are annotated. In other embodiments, the training images of the biological specimens are not annotated, i.e. they do not include any class labels. In some embodiments, each of the training images may have the same resolutions or different resolutions. In some embodiments, each of the raining images may have the same magnification or a different magnification (e.g. 10× training images, 20× training images, 40× training images, etc.). In some embodiments, the training images are several thousands of pixels in each dimension. In some embodiments, to enable annotation, patches are extracted randomly, e.g. patches having sizes of 64×64 pixels or 128×128 pixels.

TABLE 1

Examples of suitable training image datasets.

| Dataset | Number of Patches | Number of Cells | Patch Size | Resolution |
| --- | --- | --- | --- | --- |
| Her2 | 118 | 560 | 64 × 64 pixels | 20× |
| Dual ISH | 143 | 1296 | 128 × 128 pixels | 40× |
| Combined | 268 | 1822 | Mixed | Mixed |
| BB | 200 | 7162 | 128 × 128 pixels | 20× |
| BBYP | 104 | 1340 | 128 × 128 pixels | 20× |

Additional information regarding each of the datasets set forth in Table 1 are identified below:
Her2: 560 annotations of Her2 membrane stained cells.
Dual ISH: 1269 annotations of dual in situ hybridization stained cells.
Combined: Combination of Her2 and Dual ISH datasets.
BB: 1822 two-class annotations of Hematoxylin and DAB stained cells.
BBYP: IHC Duplex stained images containing 1340 annotations that fall into 5 imbalanced classes with number of members ranging from 10 to 1828.
For "Her2," "Dual ISH," and "Combined" datasets the annotations are bounding boxes for class agnostic cells; for the BB dataset, the annotation are bounding boxes with label "blue" or "brown" cells; for the BBYP dataset, the annotations are bounding boxes with label "blue tumor cell", "purple tumor cell", "yellow T-cell", "purple T-cell" and "yellow and purple T-cell" labels, which corresponds to "ki67− tumor", "ki67+ tumor", "cd8+ T-cell", "ki67+ T-cell" and "cd8+ki67+ T-cell", the classes are mutual exclusive Tuning of the pre-trained neural network (step 412) with the datasets identified in Table 1 provided the following trained neutral networks. These different trained neural networks were used in certain experiments, as detailed in the Examples section herein.
Model Zero: Faster RCNN model with Resnet-50 feature extractor pre-trained on COCO dataset.
HER2: Model Zero tuned on cell detection on Her2 data.
DUALISH: Model Zero tuned on cell detection on Dual ISH data.
Model A: Model Zero tuned on cell detection on Combined data.
Model B: Model Zero tuned on detection and classification on BB data.
Model C: Model A tuned on detection and classification on BB data.

Figure 3A:
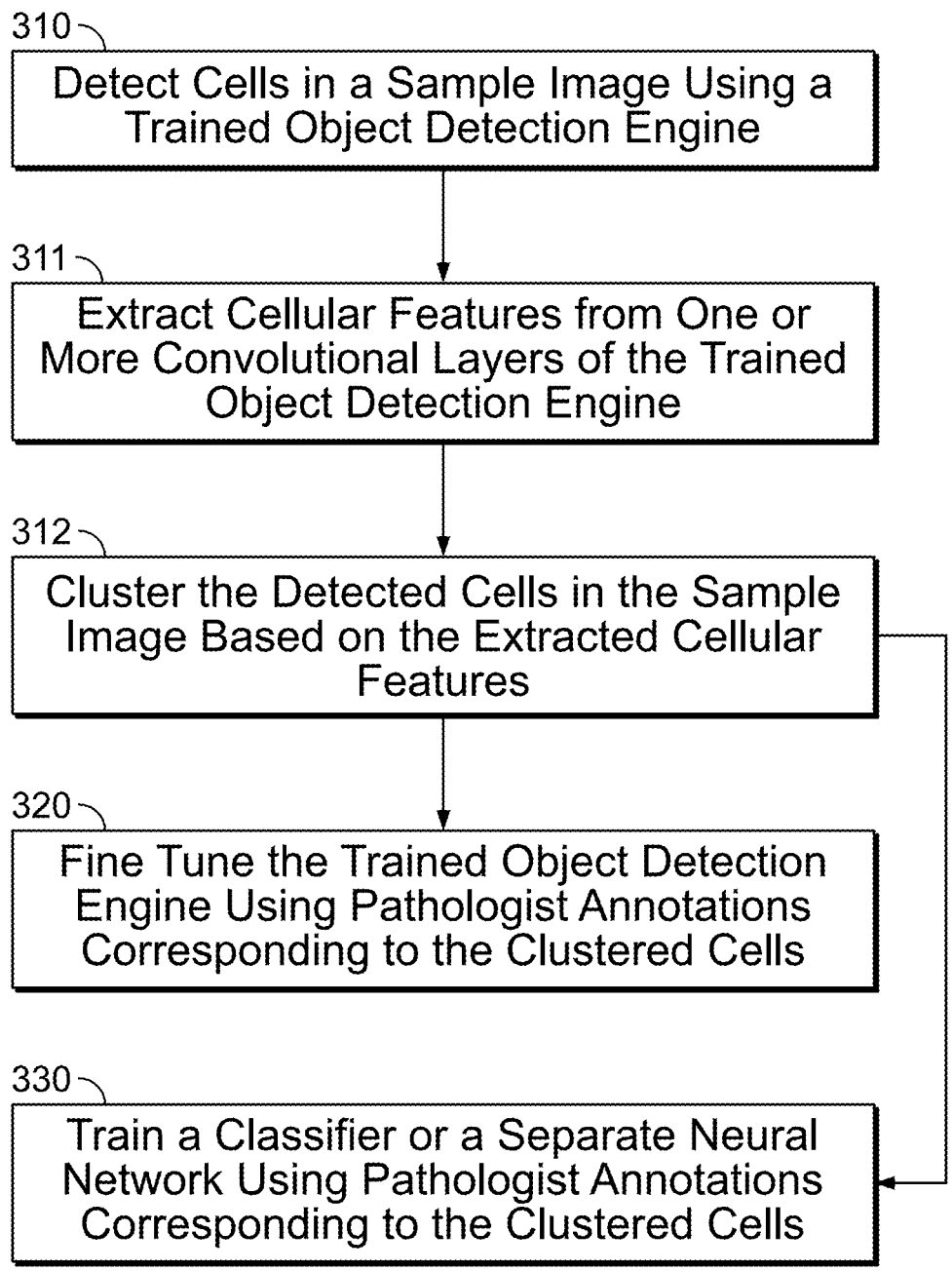
FIG. 3A provides a flow chart illustrating the steps of generating clusters of cells in accordance with one embodiment of the present disclosure.

Generation of Homogeneous Clusters of Detected Cells Using a Trained Object Detection Engine Following the tuning of a pre-trained neural network, such as by tuning the pre-trained neural network with a plurality of training images of biological specimens stained for the presence of one or more biomarkers, the tuned neural network 212 (in conjunction with other modules) is used to detect and/or classify cells in sample images, such that homogeneous clusters of detected cells may be identified in the sample images (see FIG. 3A). In other embodiments, the tuned neural network 212, in conjunction with the region proposal network 214 (collectively providing a trained object detection engine 210), is used to detect and/or classify cells in sample images, such that homogeneous clusters of detected cells may be identified in the sample images (see FIG. 3B). These sample images may then be annotated, such as by a pathologist. The skilled artisan will appreciate that the trained object detection engine 210 may be adapted to classify detected cells provided that the object detection engine 210 is one that has been trained with training images including one or more class labels.

With reference to FIG. 3A, in some embodiments, one or more sample images are obtained and provided to a trained object detection engine 210 such that cells may be detected (step 310). In some embodiments, the trained object detection engine 210 is derived from a region-based convolutional neural network. In some embodiments, the RCNN architecture is based on a Fast-RCNN architecture.

Figure 3B:
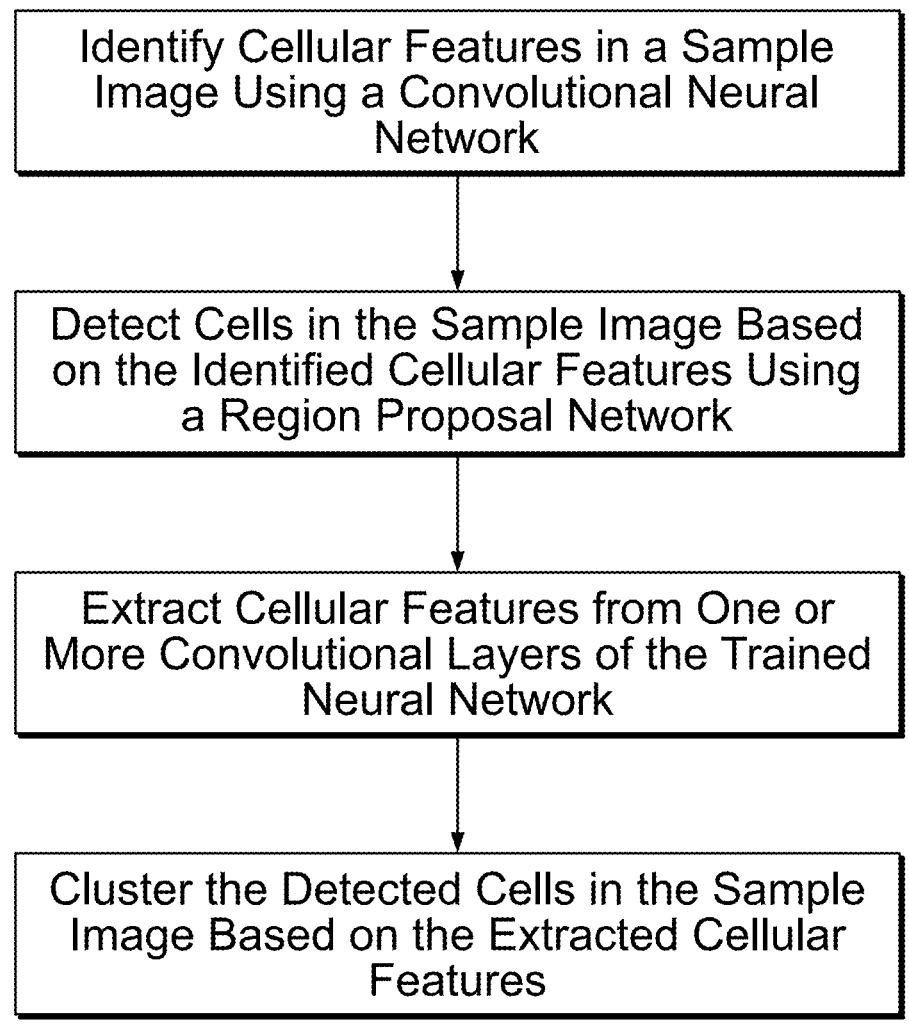
FIG. 3B provides a flow chart illustrating the steps of generating clusters of cells in accordance with one embodiment of the present disclosure.

In other embodiments, and with reference to FIG. 3B, a neural network 212 is used to identify cellular features within the one or more sample images (step 340), and then a region proposal network 214 is used to detect cells in the one or more sample images based on the identified cellular features (step 341). In other embodiments, the trained object detection engine 210 is derived from a Faster-RCNN. In yet other embodiments, the trained object detection engine 210 is based on a Faster-RCNN architecture, and where the neural network 212 comprises a deep residual network, e.g. ResNet.

In some embodiments, the object detection engine 210 includes a scaling layer. Although the trained object detection engine is trained on small human-annotatable images (64×64 pixels, 128×128 pixels, etc.), the sample images are larger in size, e.g. 100× larger in size. In some embodiments, and in place of the image resizer typically used in one of the region-based convolutional neural network architectures, a scaling layer is introduced into the trained object detection engine 210 that scales images by a constant factor irrespective of size.

In some embodiments, the object detection engine is trained for a fixed number of steps (e.g. about 30000) using a hyper-parameters suggested in a Tensorflow Object Detection API. In some embodiments, the maximum number of proposals is increased during an inference process to accommodate larger images. Detection performance was measured by the mean average precision metric at threshold 0.50 (mAP@50).

Figure 8:
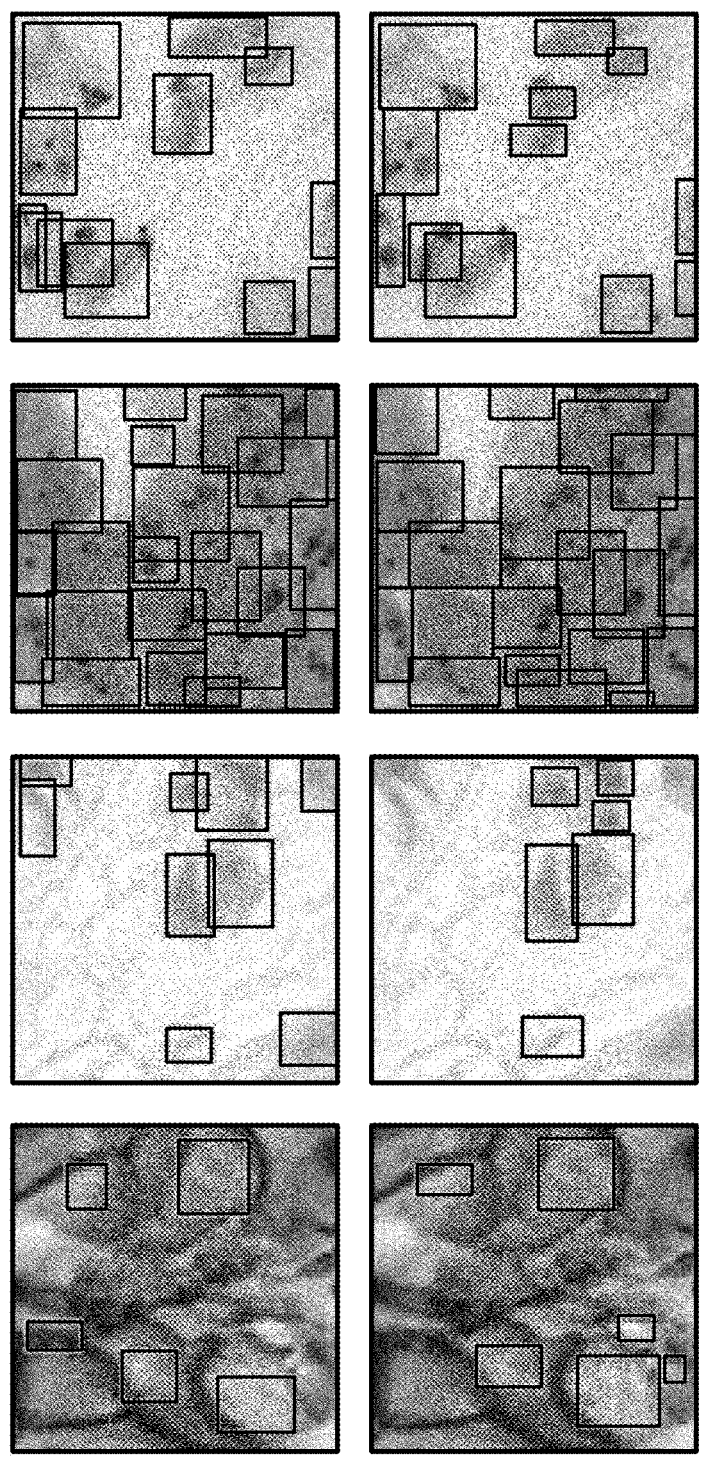
FIG. 8 provides examples of cell detection results using Model A on Her2 Dual ISH Images (top). The figure also comparatively provides ground truth annotations for the corresponding image patches (bottom).

A summary of detection (and classification where class labels are present in the training images) performance is provided in Table 2. mAP@50 refers to mean average precision, which is the average of the maximum precision at different recall values. In measuring mAP@50, a detection is considered correct if it matches a ground truth annotation with an IoU greater than 50%. Here, precision refers to true positive/total positive detections. IoU measures the overlap between two regions. Cell detection results using model A on Her2 and Dual ISHM images as compared with ground truth annotation for the corresponding patches is shown in FIG. 8. The models set forth in Table 2 are used in the Examples which follow herein.

TABLE 2

Cell detection and classification performance using the trained object detection engine.

| Validation Data | Model | mAP@50 |
|---|---|---|
| Her 2 | HER2 | 78% |
| Dual ISH | DUALISH | 86% |
| Combined | Model A | 85% |
| BB | Model B | 70% |
| BB | Model C | 72% |

Table 2 shows that Faster-RCNN, fine-tuned on different stain types (as described in the embodiments above), performs well for each stain type, even for Her2 which is a membrane stain; or for dual ISH which is DNA stain; or for BB which is a cell stain. It is believed that the difference in performance depends on the quality of the ground truth annotation for training as well as testing As noted herein, the neural network 212 may comprise a plurality of layers, e.g. convolutional layers. In some embodiments, the neural network is designed to determine certain features within the one or more sample images. The features determined by the neural network may include any suitable features described further herein or known in the art that can be inferred from the input and used to generate the output described further herein. For example, the features may include a vector of intensity values per pixel. The features may also include any other types of features described herein, e.g., vectors of scalar values, vectors of independent distributions, joint distributions, or any other suitable feature types known in the art.

In the context of biological specimens, the neural network may determine certain cellular or cellular features within provided one or more sample images of biological specimens stained for the presence of one or more biomarkers. Following the identification of cellular features (step 340) and/or the detection of cells based on the identified cellular features (step 341), at least a portion of the cellular features may be extracted from one or more layers of the neural network 212 using the feature extractor module 202 (steps 311 or 342). In some embodiments, a deep residual network, e.g. ResNet or ResNet-50, is used as first stage feature extractor of the region-based convolutional neural network. By way of non-limiting example, features from block 1, block 2, block 3 and the convolutional layer before block 1 (referred to as block 0) of the ResNet-50 architecture may be extracted and used in a downstream clustering operation.

Following the extraction of at least a portion of the cellular features from one or more layers of the neural network, clusters of homogeneous detected cells are generated (steps 312 or 343). Any clustering method may be used for this task. For example, clustering may be performed using an agglomerative clustering technique. In some embodiments, agglomerative hierarchical clustering is utilized. Agglomerative hierarchical clustering is a bottom-up clustering method where clusters have sub-clusters, which in turn have sub-clusters, etc. Agglomerative hierarchical clustering starts with every single object in a single cluster. Then, in each successive iteration, it agglomerates (merges) the closest pair of clusters by satisfying some similarity criteria, until all of the data is in one cluster.

In some embodiments, cellular features are extracted from different intermediate layers of the trained region-based convolutional neural network, and agglomerative clustering is performed as implemented in scikit-learn (see F. Pedregosa, et. al., "Scikit-learn: Machine learning in Python," Journal of Machine Learning Research, vol. 12, pp. 2825-2830, 2011).

In other embodiments, agglomerative clustering may be performed according to any of the methods described in U.S. Pat. Nos. 10,162,878, 9,411,632, and 6,625,585; or as in any of U.S. Publication Nos. 2016/0342677, 2018/0329989, or 2014/0359626, the disclosures of which are hereby incorporated by reference herein in their entireties.

An annotation module 206 may then be used by a pathologist such that one or more of the homogeneous clusters of detected cells in each sample image may be labeled. An example of a suitable annotation module is described in U.S. Pat. No. 9,818,190, the disclosure of which is hereby incorporated by reference herein in its entirety.

Figure 7:
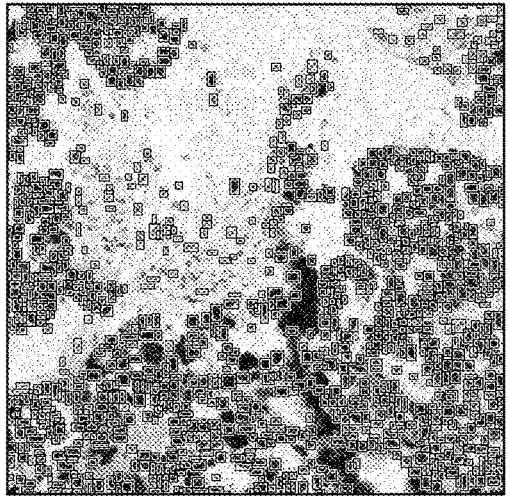
FIG. 7 illustrates the result of cell detection on a sample image, followed by identifying homogeneous clusters of the detected cells. In some embodiments, a neural network is trained using a minimal annotated dataset. In some embodiments, the trained neural network is then used to detect cells in large images, and to extract their associated features. In some embodiments, the cells are then clustered based on their features, thereby providing a pathologist with homogeneous clusters of cells that can be labeled batch by batch instead of one by one, significantly reducing the labor of ground truth laboring. In some embodiments, the identified homogeneous clusters may be annotated by a pathologist, and the annotated clusters may be used as ground truth data. It is believed that employing Faster-RCNN enables the pathologist to just provide labels to the detected bounding box of the cell candidates in the cluster, which can be differentiated by different colors.
Figure 7:
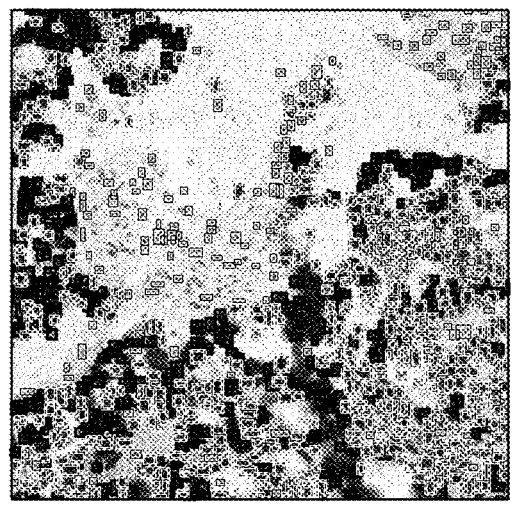
Figure 7:
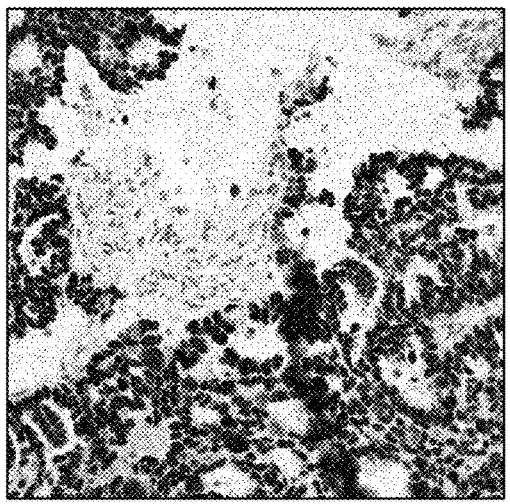

The annotations of the one or more homogeneous clusters in each of the sample images may then be used as ground truth data, such as for training a cell detection and classification engine (see FIG. 7).

Systems for Detecting and/or Classifying Cells in Test Images

Figure 5:
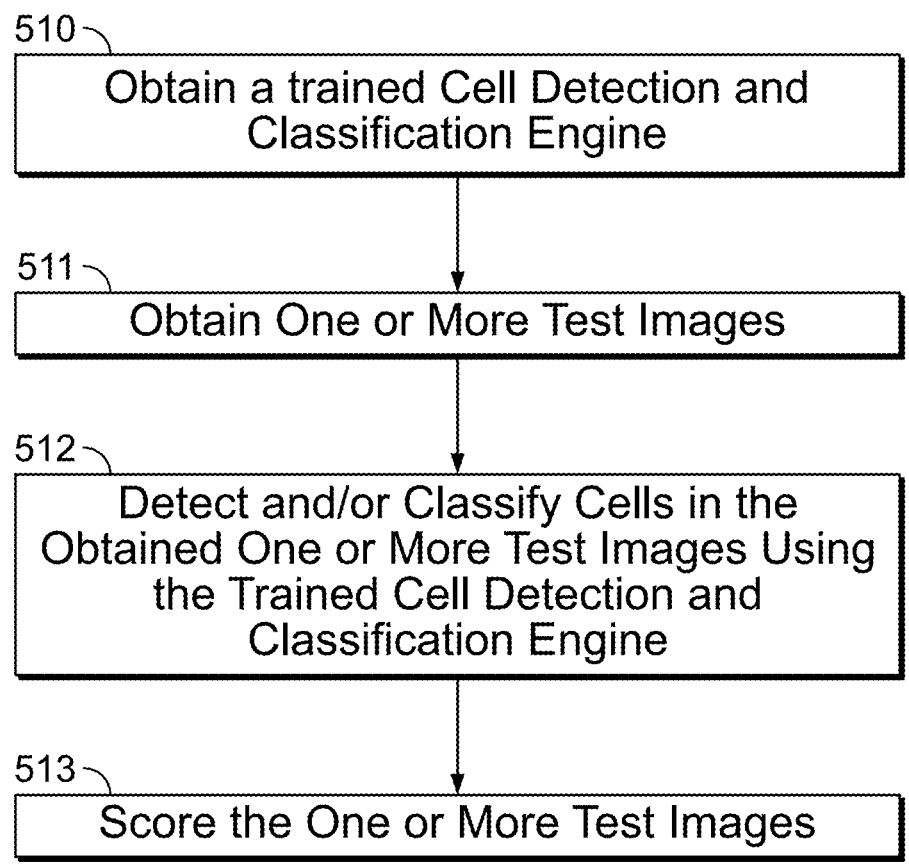
FIG. 5 provides a flow chart illustrating the steps of detecting and/or classifying cells in a test image in accordance with one embodiment of the present disclosure.

In some embodiments, the present disclosure provides a system 250 for detecting and/or classifying cells in test images. FIGS. 2C and 5 provide an overview of the systems and methods of detecting and/or classifying cells in a test image. In some embodiments, the system 250 includes a cell detection and classification engine 255 which has been trained using the ground truth data derived herein, i.e. pathologist annotations of identified homogeneous clusters of cells in sample images. In some embodiments, the cell detection and classification engine 255 includes a classifier, e.g. a support vector machine or other like ensemble learning method. Examples of suitable classifiers are described further herein. In embodiments where the cell detection and classification engine 255 includes a classifier, the cell detection and classification engine 255 may include an automated cell detection module and/or a neural network (such as a neural network adapted for feature extraction).

In some embodiments, the cell detection and classification engine 255 includes a neural network, including any of the types of neural networks described herein. In some embodiments, the cell detection and classification engine 255 includes a region-based convolutional neural network. In those embodiments, the cell detection and classification engine 255 may include an object detection engine 210 which has been further fine-tuned using the generated ground truth data.

FIG. 5 sets forth a flow chart illustrating the various steps of detecting and/or classifying cells in a test image. In some embodiments, a trained cell detection and classification engine 5 is first obtained (step 510). Additionally, one or more test images are also obtained (step 511). The cell detection and classification engine 255 is then used to detect and/or classify the cells in the one or more obtained test images (step 512). Following the detection and/or classification of the cells in the one or more obtained test images, the test images may be scored (step 513).

Automated Cell Detection Module

The procedures and automated algorithms described herein may be adapted to identify and classify various types of cells or cell nuclei based on features within the input images, including identifying and classifying tumor cells, non-tumor cells, stroma cells, and lymphocytes. The skilled artisan will appreciate that the nucleus, cytoplasm and membrane of a cell have different characteristics and that differently stained tissue samples may reveal different biological features. Indeed, the skilled artisan will appreciate that certain cell surface receptors can have staining patterns localized to the membrane or localized to the cytoplasm. Thus, a "membrane" staining pattern is analytically distinct from a "cytoplasmic" staining pattern. Likewise, a "cytoplasmic" staining pattern and a "nuclear" staining pattern are analytically distinct. Each of these distinct staining patterns may be used as features for identifying cells and/or nuclei.

Methods of identifying, classifying, and/or scoring nuclei, cell membranes, and cell cytoplasm in images of biological samples having one or more stains are described in U.S. Pat. No. 7,760,927 ("the '927 Patent"), the disclosure of which is hereby incorporated by reference herein in its entirety. For example, U.S. Pat. No. 7,760,927 describes an automated method for simultaneously identifying a plurality of pixels in an input image of a biological tissue stained with a biomarker, including considering a first color plane of a plurality of pixels in a foreground of the input image for simultaneous identification of cell cytoplasm and cell membrane pixels, wherein the input image has been processed to remove background portions of the input image and to remove counterstained components of the input image; determining a threshold level between cell cytoplasm and cell membrane pixels in the foreground of the digital image; and determining simultaneously with a selected pixel and its eight neighbors from the foreground if the selected pixel is cell cytoplasm pixel, a cell membrane pixel or a transitional pixel in the digital image using the determined threshold level.

Suitable systems and methods for automatically identifying biomarker-positive cells in an image of a biological sample are also described in United States Patent Publication No. 2017/0103521, the disclosure of which is hereby incorporated by reference herein in its entirety. For example, US2017/0103521 describes (i) reading a first digital image and a second digital image into one or more memories, the first and second digital images depicting the same area of a first slide, the first slide comprising multiple tumor cells having been stained with a first stain and with a second stain; (ii) identifying a plurality of nuclei and positional information of the nuclei by analyzing light intensities in the first digital image; (iii) identifying cell membranes which comprise the biomarker by analyzing light intensities in the second digital image and by analyzing positional information of the identified nuclei; and (iv) identifying biomarker-positive tumor cells in an area, wherein a biomarker-positive tumor cell is a combination of one identified nucleus and one identified cell membrane that surrounds the identified nucleus. Methods of detecting staining with the HER2 protein biomarker or the EGFR protein biomarker are disclosed within US2017/0103521.

In some embodiments, tumor nuclei are automatically identified by first identifying candidate nuclei and then automatically distinguishing between tumor nuclei and non-tumor nuclei. Numerous methods of identifying candidate nuclei in images of tissue are known in the art. For example, automatic candidate nucleus detection can be performed by applying a radial symmetry-based method, such as on the Hematoxylin image channel or a biomarker image channel after unmixing (see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein).

More specifically, in some embodiments the images received as input are processed such as to detect nucleus centers (seeds) and/or to segment the nuclei. For example, instructions may be provided to detect nucleus centers based on radial-symmetry voting using the techniques of Parvin (noted above). In some embodiments, nuclei are detected using radial symmetry to detect centers of nuclei and then the nuclei are classified based on the intensity of stains around the cell centers. In some embodiments, a radial symmetry-based nuclei detection operation is used as described in commonly-assigned and co-pending patent application WO/2014/140085A1, the entirety of which is incorporated herein by reference. For example, an image magnitude may be computed within an image and one or more votes at each pixel are accumulated by adding the summation of the magnitude within a selected region. Mean shift clustering may be used to find the local centers in the region, with the local centers representing actual nuclear locations. Nuclei detection based on radial symmetry voting is executed on color image intensity data and makes explicit use of the a priori domain knowledge that the nuclei are elliptical shaped blobs with varying sizes and eccentricities. To accomplish this, along with color intensities in the input image, image gradient information is also used in radial symmetry voting and combined with an adaptive segmentation process to precisely detect and localize the cell nuclei. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. For instance, nuclei seed detection involves defining a seed as a point which is assumed to lie inside a cell nucleus and serve as the starting point for localizing the cell nuclei. The first step is to detect seed points associated with each cell nuclei using a highly robust approach based on the radial symmetry to detect elliptical-shaped blobs, structures resembling cell nuclei. The radial symmetry approach operates on the gradient image using a kernel-based voting procedure. A voting response matrix is created by processing each pixel that accumulates a vote through a voting kernel. The kernel is based on the gradient direction computed at that particular pixel and an expected range of minimum and maximum nucleus size and a voting kernel angle (typically in the range $[\pi/4, \pi/8]$). In the resulting voting space, local maxima locations that have a vote value higher than a predefined threshold value are saved out as seed points. Extraneous seeds may be discarded later during subsequent segmentation or classification processes. Other methods are discussed in US Patent Publication No. 2017/0140246, the disclosure of which is incorporated by reference herein.

Nuclei may be identified using other techniques known to those of ordinary skill in the art. For example, an image magnitude may be computed from a particular image channel of one of the H&E or IHC images, and each pixel around a specified magnitude may be assigned a number of votes that is based on a summation of the magnitude within a region around the pixel. Alternatively, a mean shift clustering operation may be performed to find the local centers within a voting image, which represents the actual location of the nucleus. In other embodiments, nuclear segmentation may be used to segment the entire nucleus based on the now-known centers of the nuclei via morphological operations and local thresholding. In yet other embodiments, model-based segmentation may be utilized to detect nuclei (i.e. learning the shape model of the nuclei from a training data set and using that as the prior knowledge to segment the nuclei in the testing image).

In some embodiments, the nuclei are then subsequently segmented using thresholds individually computed for each nucleus. For example, Otsu's method may be used for segmentation in a region around an identified nucleus since it is believed that the pixel intensity in the nuclear regions varies. As will be appreciated by those of ordinary skill in the art, Otsu's method is used to determine an optimal threshold by minimizing the intra-class variance and is known to those of skill in the art. More specifically, Otsu's method is used to automatically perform clustering-based image thresholding or, the reduction of a gray level image to a binary image. The algorithm assumes that the image contains two classes of pixels following a bi-modal histogram (foreground pixels and background pixels). It then calculates the optimum threshold separating the two classes such that their combined spread (intra-class variance) is minimal, or equivalent (because the sum of pairwise squared distances is constant), so that their inter-class variance is maximal.

In some embodiments, the systems and methods further comprise automatically analyzing spectral and/or shape features of the identified nuclei in an image for identifying nuclei of non-tumor cells. For example, blobs may be identified in the first digital image in a first step. A "blob" as used herein can be, for example, a region of a digital image in which some properties, e.g. the intensity or grey value, are constant or vary within a prescribed range of values. All pixels in a blob can be considered in some sense to be similar to each other. For example, blobs may be identified using differential methods which are based on derivatives of a function of position on the digital image, and methods based on local extrema. A nuclear blob is a blob whose pixels and/or whose outline shape indicate that the blob was probably generated by a nucleus stained with the first stain. For example, the radial symmetry of a blob could be evaluated to determine if the blob should be identified as a nuclear blob or as any other structure, e.g. a staining artifact. For example, in case a blob has a lengthy shape and is not radially symmetric, said blob may not be identified as a nuclear blob but rather as a staining artifact. Depending on the embodiment, a blob identified to be a "nuclear blob" may represent a set of pixels which are identified as candidate nuclei and which may be further analyzed for determining if said nuclear blob represents a nucleus. In some embodiments, any kind of nuclear blob is directly used as an "identified nucleus." In some embodiments, filtering operations are applied on the identified nuclei or nuclear blobs for identifying nuclei which do not belong to biomarker-positive tumor cells and for removing said identified non-tumor nuclei from the list of already identified nuclei or not adding said nuclei to the list of identified nuclei from the beginning. For example, additional spectral and/or shape features of the identified nuclear blob may be analyzed to determine if the nucleus or nuclear blob is a nucleus of a tumor cell or not. For example, the nucleus of a lymphocyte is larger than the nucleus of other tissue cell, e.g. of a lung cell. In case the tumor cells are derived from a lung tissue, nuclei of lymphocytes are identified by identifying all nuclear blobs of a minimum size or diameter which is significantly larger than the average size or diameter of a normal lung cell nucleus. The identified nuclear blobs relating to the nuclei of lymphocytes may be removed (i.e., "filtered out from") the set of already identified nuclei. By filtering out the nuclei of non-tumor cells, the accuracy of the method may be increased. Depending on the biomarker, also non-tumor cells may express the biomarker to a certain extent and may therefore produce an intensity signal in the first digital image which does not stem from a tumor cell. By identifying and filtering out nuclei which do not belong to tumor cells from the totality of the already identified nuclei, the accuracy of identifying biomarker-positive tumor cells may be increased. These and other methods are described in US Patent Publication 2017/0103521, the disclosure of which is incorporated by reference herein in its entirety. In some embodiments, once the seeds are detected, a locally adaptive thresholding method may be used, and blobs around the detected centers are created. In some embodiments, other methods may also be incorporated, such as marker-based watershed algorithms can also be used to identify the nuclei blobs around the detected nuclei centers. These and other methods are described in PCT Publication No. WO2016/120442, the disclosure of which is incorporated by reference herein in its entirety.

Following detection of the nuclei, features (or metrics) are derived from within the input image. The derivation of metrics from nuclear features are well known in the art and any nuclear features known may be used in the context of the present disclosure. Non-limiting examples of metrics that may be computed include:

(A) Metrics Derived from Morphology Features

A "morphology feature" as used herein is, for example, a feature being indicative of the shape or dimensions of a nucleus. Without wishing to be bound by any particular theory, it is believed that morphological features provide some vital information about the size and shape of a cell or its nucleus. For example, a morphology feature may be computed by applying various image analysis algorithms on pixels contained in or surrounding a nuclear blob or seed. In some embodiments, the morphology features include area, minor, and major axis lengths, perimeter, radius, solidity, etc. At the cellular level, such features are used to classify a nucleus as belonging to a healthy or diseased cell. At the tissue level, the statistics of these features over the tissue are exploited in the classification of a tissue as diseased or not.

(B) Metrics Derived from Color.

In some embodiments, metrics derived from color include color ratios, R/(R+G+B). or color principal components. In other embodiments, metrics derived from color include local statistics of each of the colors (mean/median/variance/std dev) and/or color intensity correlations in a local image window.

(C) Metrics Derived from Intensity Features

The group of adjacent cells with certain specific property values is set up between the dark and the white shades of grey colored cells represented in a histopathological slide image. The correlation of the color feature defines an instance of the size class, thus this way the intensity of these colored cells determines the affected cell from its surrounding cluster of dark cells.

(D) Metrics Derived from Spatial Features

In some embodiments, spatial features include a local density of cells; average distance between two adjacent detected cells; and/or distance from a cell to a segmented region.

Of course, other features, as known to those of ordinary skill in the art, may be considered and used as the basis for computation of features.

Classifier Module

In embodiments where the cell detection and classification engine 255 includes a classifier, the classifier may be any known to those of skill in the art. For example, in some embodiments, the learnt supervised classifier is a Support Vector Machine ("SVM"). In general, an SVM is a classification technique, which is based on statistical learning theory where a nonlinear input data set is converted into a high dimensional linear feature space via kernels for the non-linear case. A support vector machines project a set of training data, E, that represents two different classes into a high-dimensional space by means of a kernel function, K. In this transformed data space, nonlinear data are transformed so that a flat line can be generated (a discriminating hyperplane) to separate the classes so as to maximize the class separation. Testing data are then projected into the high-dimensional space via K, and the test data (such as the features or metrics enumerated below) are classified on the basis of where they fall with respect to the hyperplane. The kernel function K defines the method in which data are projected into the high-dimensional space.

In other embodiments, the learnt supervised classifier is a random forest classifier. For example, the random forest classifier may be trained by: (i) creating a training set of tumor and non-tumor cells, (ii) extracting features for each cell, and (iii) training the random forest classifier to distinguish between tumor cells and non-tumor cells based on the extracted features (such as features extracted from a neural network portion of the cell detection and classification engine 255). The trained random forest classifier may then be applied to classify the cells in a test image into tumor cells and non-tumor cells. Optionally, the random forest classifier may be further trained to distinguish between different classes of non-tumor nuclei, such as lymphocyte nuclei and stromal nuclei (and even between different types of lymphocytes).

Scoring Module

In some embodiments, derived stain intensity values, counts of specific cells, or other classification results may be used to determine various marker expression scores, such as percent positivity, an Allred score, or an H-Score, using scoring module 260. Methods for scoring are described in further detail in commonly-assigned and co-pending applications WO/2014/102130A1 "Image analysis for breast cancer prognosis" filed Dec. 19, 2013, and WO/2014/140085A1 "Tissue object-based machine learning system for automated scoring of digital whole slides," filed Mar. 12, 2104, the contents of each are hereby incorporated by reference in their entirety herein. For example, based at least in part on the number of biomarker-positive tumor cells/biomarker-positive non-tumor cells, a score (e.g., a whole-slide score, or a score for an annotated area of an image, such as an area annotated by a pathologist or histologist) can be determined. In some embodiments, for each detected cellular blob, average blob intensity, color and geometric features, such as area and shape of the detected cellular blob may be computed, and the cellular blobs are classified into tumor cells and cells of non-tumor cells. The number of identified cells output corresponds to the total number of biomarker-positive tumor cells detected in a region, as evidenced by the number of tumor cells counted. Other methods of scoring a sample are described in PCT Publication No. WO/2017/093524, and US Patent Publication Nos. 2017/0103521 and 2017/0270666, the disclosures of which are hereby incorporated by reference herein in their entireties.

In some embodiments, the expression score is an H-score. The H-score is, for example, a method of assessing the extent of cellular immunoreactivity. In dependence on the biomarker, different approaches for H-score calculation may be used. To give an illustrative example, the H-score for steroid receptor cells can be obtained by the formula: 3× percentage of strongly staining cells+2× percentage of moderately staining cells+percentage of weakly staining cells, giving a range of 0 to 300.

In some embodiments, the 'H' score is used to assess the percentage of tumor cells with cell membrane staining graded as 'weak,' 'moderate' or 'strong.' The grades are summated to give an overall maximum score of 300 and a cut-off point of 100 to distinguish between a 'positive' and 'negative.' For example, a membrane staining intensity (0, 1+, 2+, or 3+) is determined for each cell in a fixed field of view (or here, each cell in a tumor or cell cluster). The H-score may simply be based on a predominant staining intensity, or more complexly, can include the sum of individual H-scores for each intensity level seen. By one method, the percentage of cells at each staining intensity level is calculated, and finally, an H-score is assigned using the following formula: [1×(% cells 1+)+2×(% cells 2+)+3×(% cells 3+)]. The final score, ranging from 0 to 300, gives more relative weight to higher-intensity membrane staining in a given tumor sample. The sample can then be considered positive or negative on the basis of a specific discriminatory threshold. Additional methods of calculating an H-score are described in United States Patent Publication 2015/0347702, the disclosure of which is hereby incorporated by reference herein in its entirety.

By way of example only, in embodiments where the samples are stained for the presence of a lymphocyte biomarker and also for the presence of PD-L1, PD-L1 expression may be scored by: (a) identifying tumor cells and lymphocytes in the tumor sample; (b) determining the number of tumor cells and lymphocytes expressing PD-L1 and/or the relative intensity of PD-L1 expression in said cells; and (c) categorizing the tumor according to the PD-L1 expression determined in (b). In some embodiments, the expression of PD-L1 is determined by specifically detecting PD-L1 protein and/or PD-L1 mRNA in the tumor. In some embodiments, the cells are considered to express PD-L1 when the cell has at least partial membrane staining of PD-L1 protein detected by IHC. In some embodiments, the tumor is categorized according to one or both of a modified H-score (MHS) or a modified proportion score (MPS), both computed from step (b) (see US Publication No. 2017/0372117 for additional information, the disclosure of which is hereby incorporated by reference herein in its entirety).

In some embodiments, assigning the MHS comprises (i) estimating, across all of the viable tumor cells and stained mononuclear inflammatory cells in all of the examined tumor nests, four separate percentages for cells that have no staining, weak staining (+1), moderate staining (+2) and strong staining (+3), wherein a cell must have at least partial membrane staining to be included in the weak, moderate or strong staining percentages, and wherein the sum of all four percentages equals 100; and (ii) inputting the estimated percentages into the formula of 1×(percent of weak staining cells)+2×(percent of moderate staining cells)+3×(percent of strong staining cells), and assigning the result of the formula to the tissue section as the MHS; wherein assigning the MPS comprises estimating, across all of the viable tumor cells and mononuclear inflammatory cells in all of the examined tumor nests, the percentage of cells that have at least partial membrane staining of any intensity, and assigning the resulting percentage to the tissue section as the MPS; and wherein if both the MHS and MPS are assigned, the assignments may be made in either order or simultaneously. For example, the four categories "no", "weak", "moderate" and "strong" may be defined, for example, as non-overlapping intensity threshold ranges; for example, a cell pixel region may be considered as a cell with "no staining" if the average intensity value is less than 5%, as a cell with "weak staining" if the average intensity value is >5% and <25%, as a cell with "moderate staining" if the average intensity value is >=25% and <75%, and as a cell with "strong staining" if the average intensity value is >=75%.

In some embodiments, the expression score is an Allred score. The Allred score is a scoring system which looks at the percentage of cells that test positive for hormone receptors, along with how well the receptors show up after staining (this is called "intensity"). This information is then combined to score the sample on a scale from 0 to 8. The higher the score, the more receptors are found and the easier they are to see in the sample.

EXAMPLE

Cell Clustering

Figure 9A:
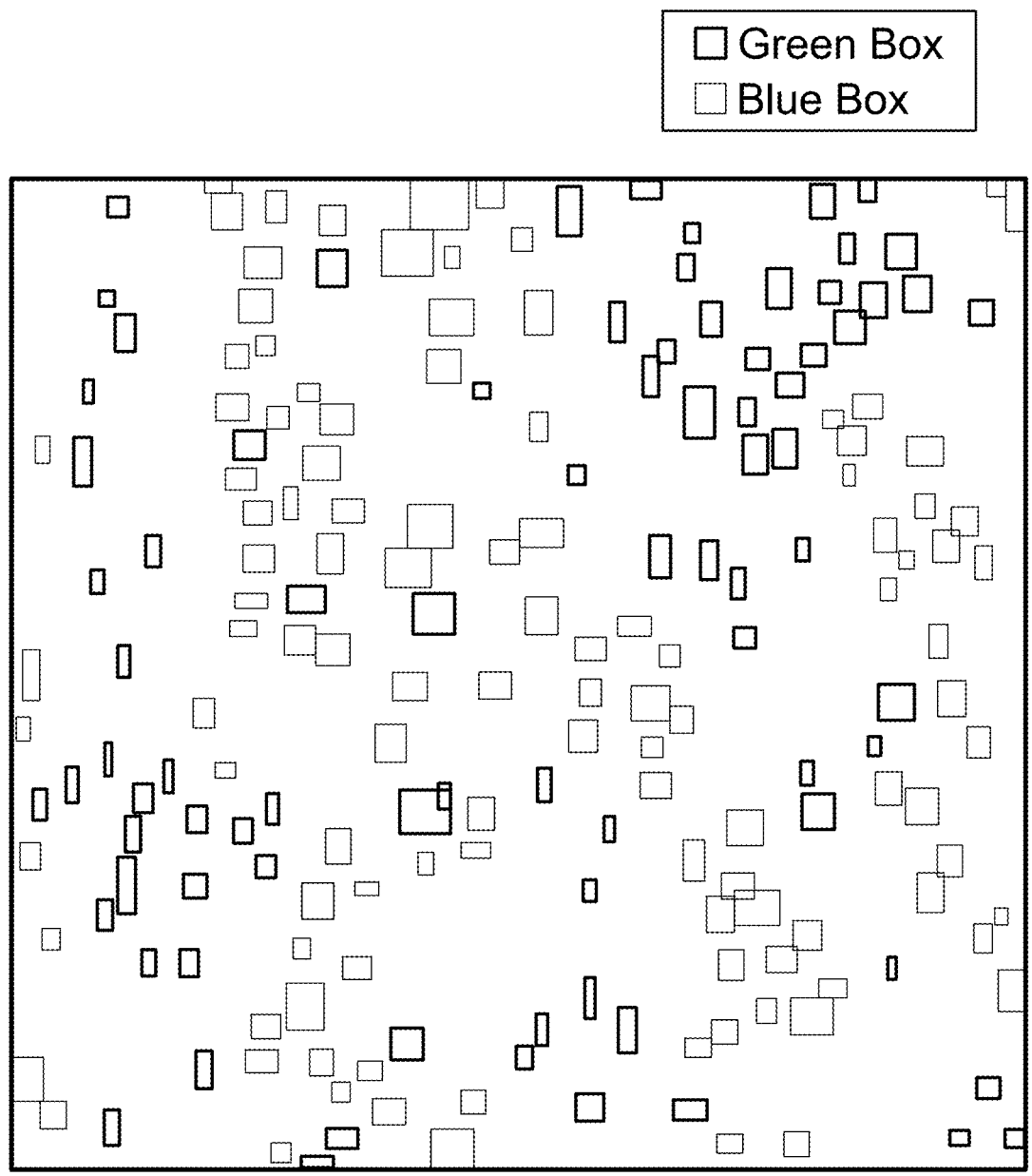
FIG. 9A illustrates the result of clustering using a trained object detection engine, the object detection engine is based on a Faster-RCNN architecture.
Figure 9B:
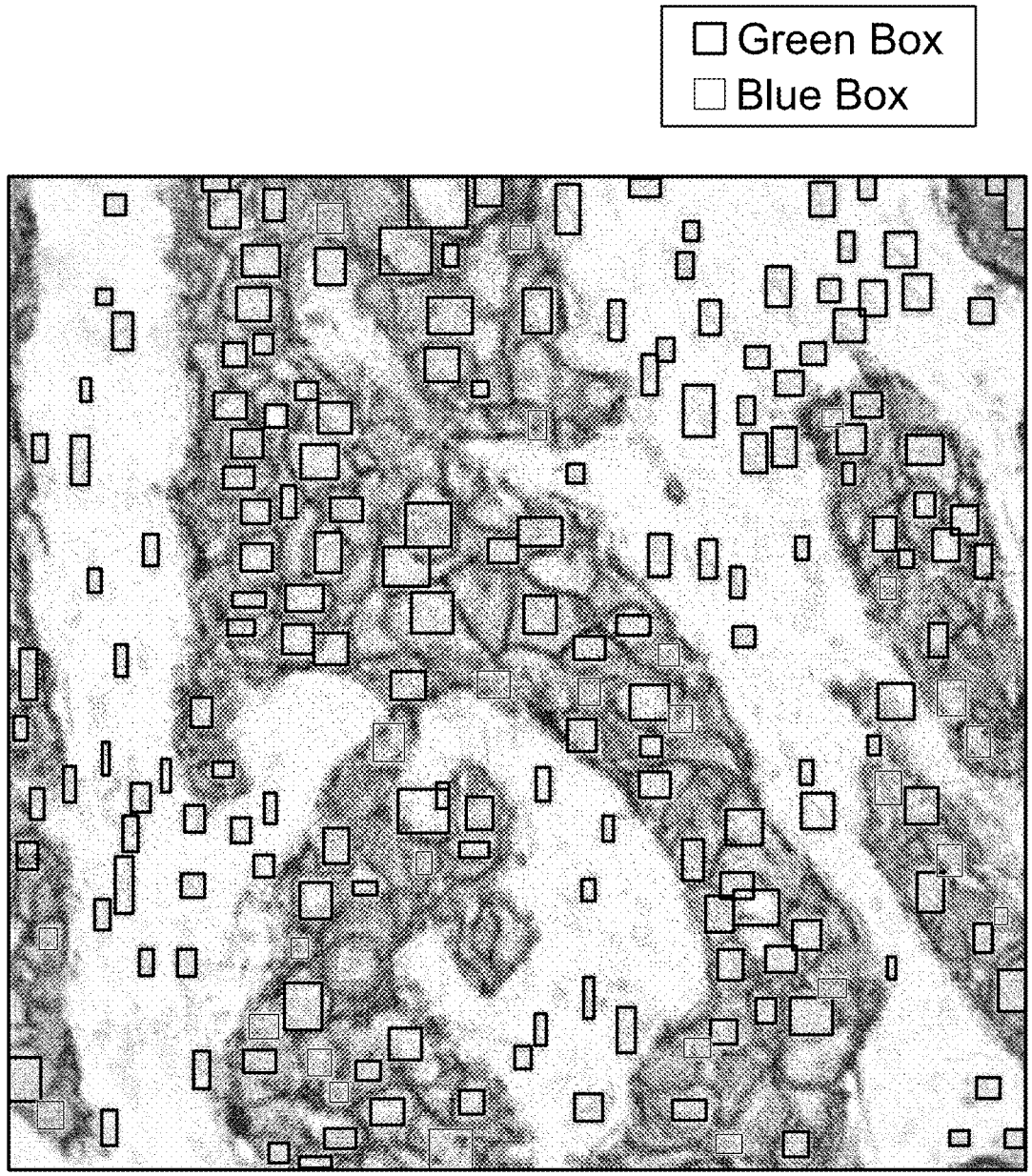
FIG. 9B illustrates the clustering of cells using RGB values of detected cells. The bounding boxes can be generated by Matlab Image Labeler APP. The clusters are computed using methods, such as K-means. In some embodiments, agglomerative clustering is implemented in scikit-learn, as described further herein.

During the process of learning to detect and localize cells, Model A learns features that can facilitate clustering of cells. Although model A was not provided with any class labels, these features yield better clustering results (see FIG. 9A) as compared with the original RGB values of cells (see FIG. 9B). Qualitative cell clustering performance is illustrated in FIGS. 9A and 9B. In FIG. 9A, blue boxes were placed mainly on Her2 positive cells, while the green boxes were placed on Her2 negative cells, which means that the two types of cells were separated well through clustering using features derived from Faster-RCNN. Even though we did not provide cell class label for fine tuning the Faster-RCNN, the pre-trained Faster-RCNN already provided richer feature representations which were "transferred" to the fine-tuned Faster-RCNN. It was found that this improved clustering performance. Features extracted from block 1 of Model A enable meaningful clustering of cells (see FIG. 9A).

Figure 10A:
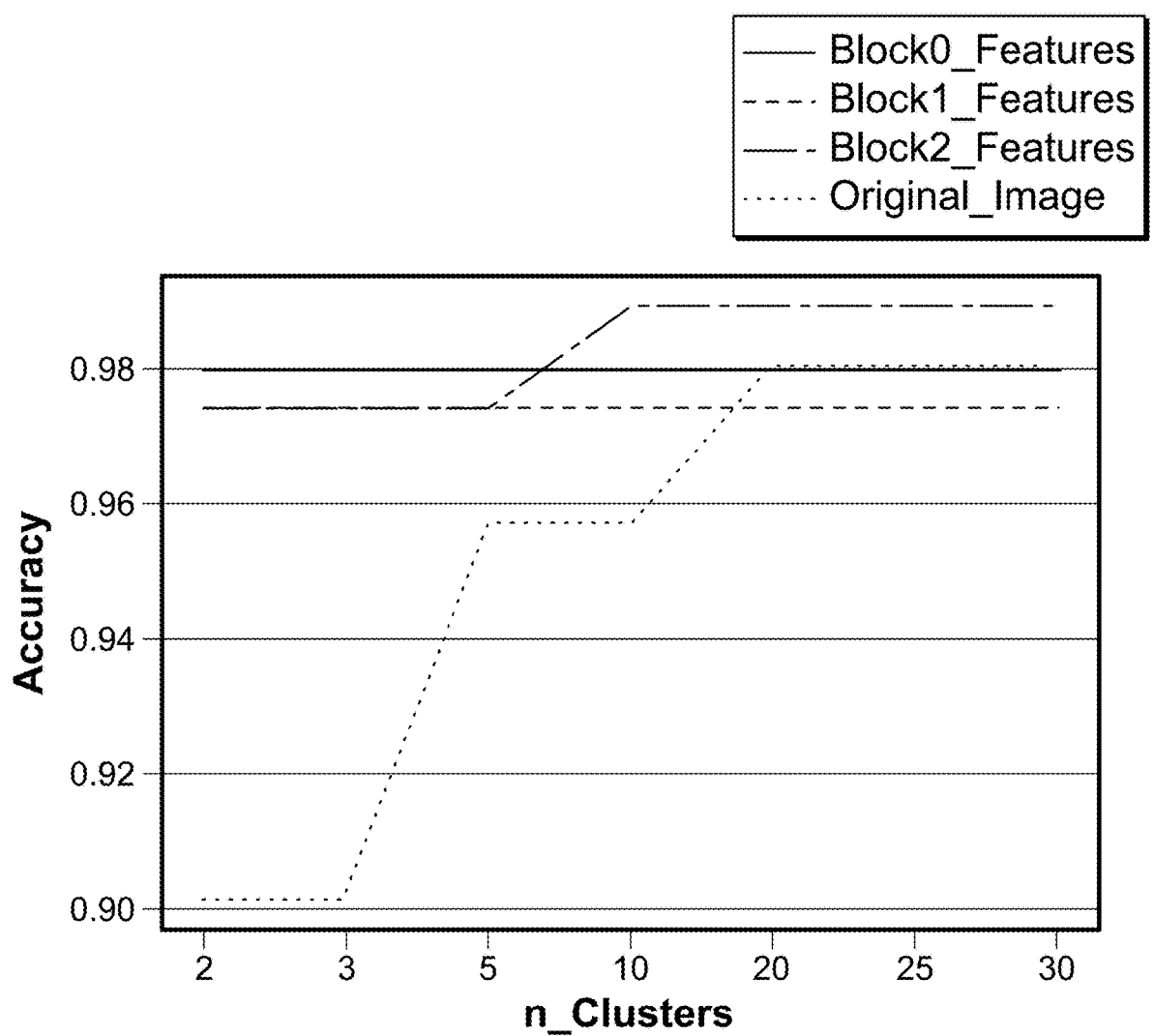
FIG. 10A provides a graph showing an evaluation of clustered based on Model A representation of BB data (i.e. 1822 two-class annotations of Hematoxylin and DAB stained cells).

In FIG. 9B, blue boxes were placed on a few Her2 positive cells, while green boxes were placed on both Her2 positive and negative cells, indicating poor separation of the two types of cells through clustering using RGB. Clustering of cells based on their original RGB pixel values does not look meaningful (see FIG. 9B). After qualitatively observing meaningful cluster patterns in HER2 images, we annotated a dataset BB with two classes, to enable quantitative evaluation of the advantage of using Faster-RCNN features for clustering. FIG. 10A summarizes clustering performance using representations from different convolutional layers of Model A as well as the original RGB representation of detected cells. When limiting the number if clusters to two, Faster-RCNN features have a clear 8% advantage over RGB representations. In other words, if we cluster cells into two clusters using Faster-RCNN features and assign the cluster labels to all cells in each cluster, we achieve a 98% classification accuracy while the same procedure leads to 90% accuracy if we use RGB representations. In addition, the features extracted from block0, block1 and block2 had similar performance for the BB dataset; and block0 features had very consistent performance for different number of clusters It was next determined whether training the object detection engine to classify the same type of cells that are later going to be clustered increases the usefulness of the learned features for the task of clustering compared an object detection engine trained merely to detect cells. To answer this question, we measured performance of clustering using features extracted from Model A, Model B, Model C, and Model Zero. Although using representations learned by any of these models leads to at least a 7% improvement over the original RGB representation of cells, we did not observe any significant difference between results from these models. This demonstrates that even the features extracted from Model Zero which has only been trained on the COCO dataset can be used to meaningfully cluster cells and consequently ameliorate ground truth labelling even further.

Clustering of Unseen Classes

BBYT images contain five classes of cells. Some of these classes are easily distinguishable by RGB values, while others are defined by both RGB and morphology or context. A class of tumor cells presents as blue similarly to a class of regular cells, and another class of tumor cells shares a purple color representation with a class of T-Cells. These classes can be differentiated based on cell density, shape and context. In this section we investigate the utility of Model B learned representations compared to original RGB representation of BBYP cells for clustering them into homogeneous clusters. We hypothesize that since CNN features provide a more global view of objects due to their multi-level abstraction compared to original image pixels, they should provide better distinction between cell classes that look similar in individual appearance but can be distinguished by contextual information (see FIG. 10B). In this case, the features derived from the fine-tuned Faster-RCNN using two class labels (from BB dataset) were able to differentiate five types of cells well enough through clustering, even with the very small number of clusters (e.g. 5), with a performance gain of 15% when compared with the original RGB value. Block0 features were believed to have the best performance for all the number of clusters.

Transferring Further

Figure 10B:
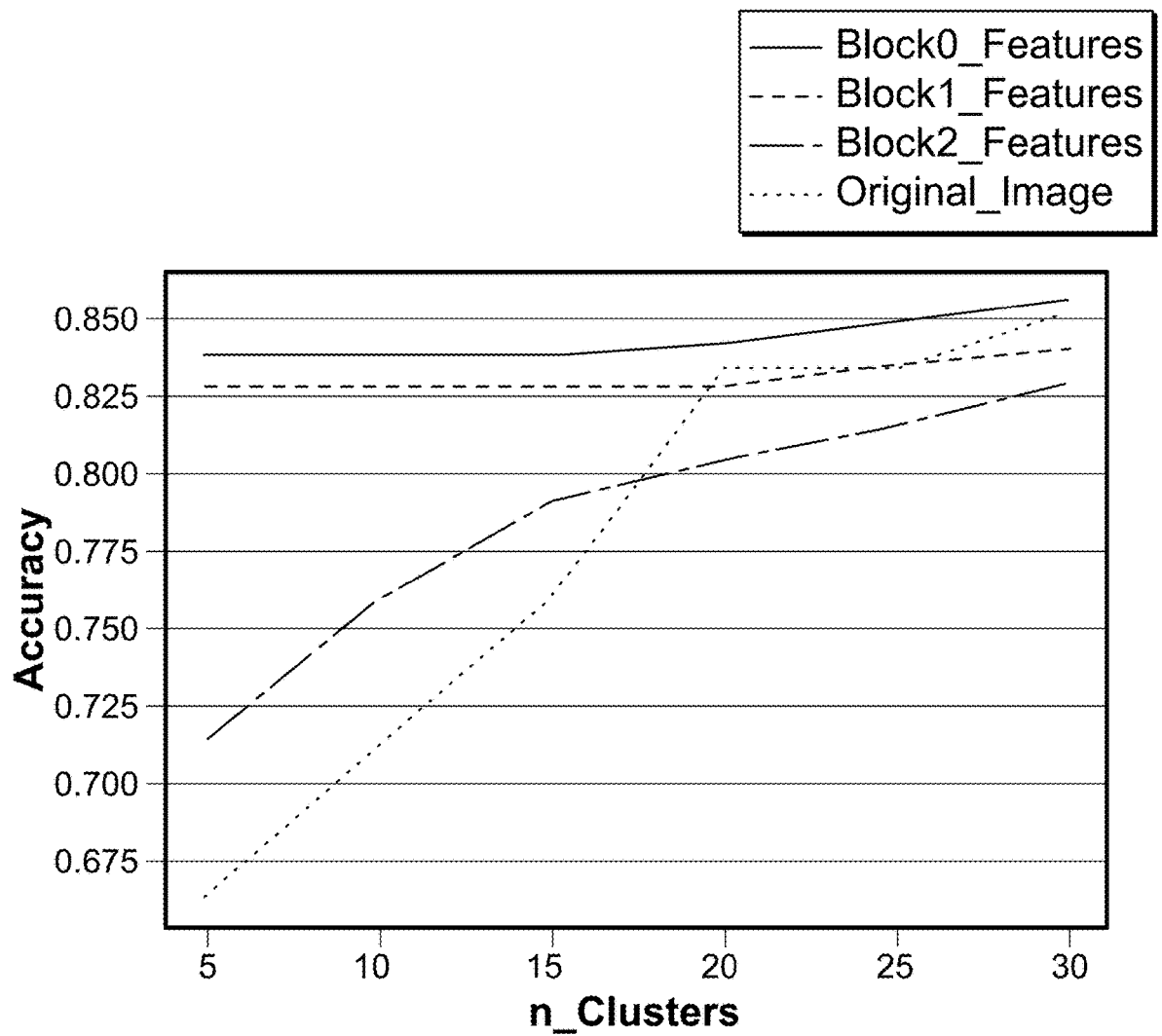
FIG. 10B provides a graph showing an evaluation of clustering based on Model B representation of BBYP data (i.e. IHC Duplex stained images containing 1340 annotations that fall into 5 imbalanced classes with number of members ranging from 10 to 1828).
Figure 11:
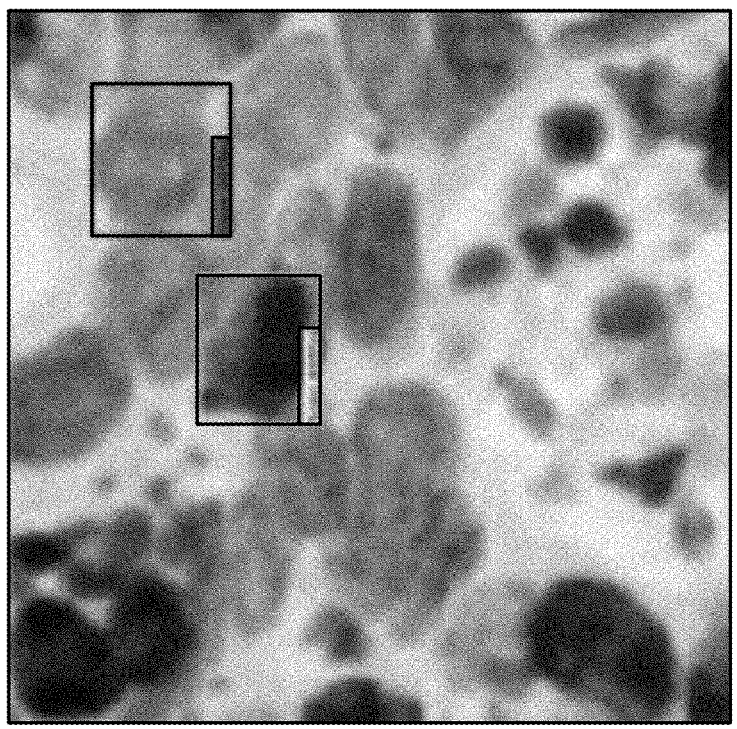
FIG. 11 provides examples of T-cells (right) and tumor cells (left) in the BBYP dataset. Ki67+ and Ki67− tumor cells have the same color as Ki68+ and Ki67− T-cells, respectively. These cells can be differentiated based on cell size, shape, and context.
Figure 11:
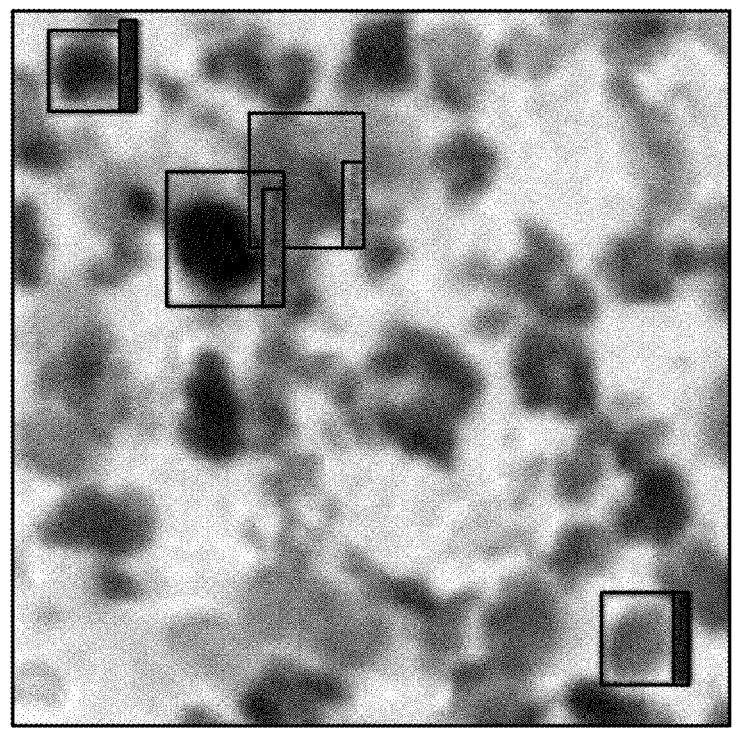

BBYP images are stained by Discovery Yellow and Discovery Purple chromogens to identify 5 classes of cells of interest, i.e., ki67+/− tumor cells, Ki67+/− T-Cells and CD8+ T-Cells. Some of these classes are easily distinguishable by color, while others are defined by both color and morphology or context (see FIG. 11). We hypothesize that since CNN features provide a more global view of objects due to their multi-level abstraction compared to original image pixels, they should provide better distinction between cell classes that look similar in individual appearance but can be distinguished by contextual information. As shown in FIG. 10B, clustering BBYT cells using Model B's features yields a 15% advantage over using original RGB representation of these cells and continue to outperform them as we increase the number of clusters, supporting our initial hypothesis. Using features from other models led to similar results.

Conclusions

We show that pre-training on publicly available large scale object detection datasets, reduces the need for supervision. The closest prior art (Rene Bidart, et. al., "Localization and classification of cell nuclei in post-neoadjuvant breast cancer surgical specimen using fully convolutional networks," in Medical Imaging 2018: Digital Pathology. International Society for Optics and Photonics, 2018, vol. 10581) to our work uses 27K dot annotations by a pathologist while we use only 1800 bounding box annotations to train Model A.

We also demonstrate the utility of Faster R-CNN to handle histology images of different resolutions at the same time and perform inference on test images 100× the size of training patches. The limitation here is not algorithmic but memory related.

We propose to facilitate ground truth labeling by proposing annotation boxes that can be fine-tuned by the pathologist, if needed, and clustering detected cells into several homogeneous subsets reducing the burden of ground truth labeling from an order of number of cells in the dataset to the number of clusters.

As shown in FIG. 8, sometimes the model is penalized for detecting cells missed by the annotator. Due to the ambiguity of the nature of objects present in histology images, several annotators need to be employed to annotate the same dataset, and performance of the detection and classification models should be compared to annotator agreement rate.

Other Components for Practicing Embodiments of the Present Disclosure

Other components (e.g. systems or modules) are described below which may be used in conjugation with the systems and methods of the present disclosure.

Unmixing Module

In some embodiments, the images received as input may be multiplex images, i.e. the image received is of a biological specimen stained with more than one stain. In these embodiments, and prior to further processing, the multiple image is first unmixed into its constituent channels, where each unmixed channel corresponds to a particular stain or signal. In some embodiments, the unmixed images (often referred to as "channel images" or "image channel images") and may be used as the input for each module described herein. For example, inter-marker heterogeneity may be determined with a first H&E image, a second multiplex image stained for a plurality of cluster of differentiation markers (CD3, CD8, etc.), and a plurality of simplex images each stained for a particular biomarker (e.g. ER, PR, Ki67, etc.). In this example, the multiplex image is first unmixed into its constituent channel images, and those channel images may be used along with the H&E image and the plurality of simplex images to determined inter-marker heterogeneity.

In some embodiments, in a sample comprising one or more stains and hematoxylin, individual images may be produced for each channel of the one or more stains and hematoxylin. Without wishing to be bound by any particular theory, it is believed that these channels highlight different tissue structures in the tissue image, thus, they may be referred to as structural image channels. In some embodiments, unmixing provides at least a hematoxylin image channel image. In some embodiments, an acquired image is unmixed into a separate channel representing the local amounts of hematoxylin and highlighting cells regions within the image. The skilled artisan will appreciate that features extracted from these channels are useful in describing the different biological structures present within any image of a tissue.

The multi-spectral image provided by the imaging system 202 is a weighted mixture of the underlying spectral signals associated the individual biomarkers and noise components. At any particular pixel, the mixing weights are proportional to the biomarker expressions of the underlying co-localized biomarkers at the particular location in the tissue and the background noise at that location. Thus, the mixing weights vary from pixel to pixel. The spectral unmixing methods disclosed herein decompose the multi-channel pixel value vector at each and every pixel into a collection of constituent biomarker end members or components and estimate the proportions of the individual constituent stains for each of the biomarkers.

Unmixing is the procedure by which the measured spectrum of a mixed pixel is decomposed into a collection of constituent spectra, or endmembers, and a set of corresponding fractions, or abundances, that indicate the proportion of each endmember present in the pixel. Specifically, the unmixing process can extract stain-specific channels to determine local concentrations of individual stains using reference spectra that are well known for standard types of tissue and stain combinations. The unmixing may use reference spectra retrieved from a control image or estimated from the image under observation. Unmixing the component signals of each input pixel enables retrieval and analysis of stain-specific channels, such as a hematoxylin channel and an eosin channel in H&E images, or a diaminobenzidine (DAB) channel and a counterstain (e.g., hematoxylin) channel in IHC images. The terms "unmixing" and "color deconvolution" (or "deconvolution") or the like (e.g. "deconvolving," "unmixed") are used interchangeably in the art.

In some embodiments, the multiplex images are unmixed with unmixing module 205 using liner unmixing. Linear unmixing is described, for example, in 'Zimmermann "Spectral Imaging and Linear Unmixing in Light Microscopy" Adv Biochem Engin/Biotechnol (2005) 95:245-265' and in in C. L. Lawson and R. J. Hanson, "Solving least squares Problems", PrenticeHall, 1974, Chapter 23, p. 161,' the disclosures of which are incorporated herein by reference in their entirety. In linear stain unmixing, the measured spectrum ($S(\lambda)$) at any pixel is considered a linear mixture of stain spectral components and equals the sum of the proportions or weights (A) of each individual stain's color reference ($R(\lambda)$) that is being expressed at the pixel $$S(\lambda)=A_1 \cdot R_1(\lambda)+A_2 \cdot R_2(\lambda)+A_3 \cdot R_3(\lambda) \ldots A_i \cdot R_i(\lambda)$$

which can be more generally expressed as in matrix form as $$S(\lambda)=\Sigma A_i \cdot R_i(\lambda) \text{ or } S=R \cdot A$$

If there are M channels images acquired and N individual stains, the columns of the M×N matrix R are the optimal color system as derived herein, the N×1 vector A is the unknown of the proportions of individual stains and the M×1 vector S is the measured multichannel spectral vector at a pixel. In these equations, the signal in each pixel (S) is measured during acquisition of the multiplex image and the reference spectra, i.e. the optimal color system, is derived as described herein. The contributions of various stains ($A_i$) can be determined by calculating their contribution to each point in the measured spectrum. In some embodiments, the solution is obtained using an inverse least squares fitting approach that minimizes the square difference between the measured and calculated spectra by solving the following set of equations, $$[\partial \Sigma_j \{S(\lambda_j)-\Sigma_i A_i \cdot R_i(\lambda)\}2]/\partial A_i=0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems and determining high-quality sets of reference vectors for the training assays.

In other embodiments, unmixing is accomplished using the methods described in WO2015/124772, entitled "Group Sparsity Model for Image Unmixing," filed on Feb. 23, 2015, the disclosure of which is hereby incorporated by reference in its entirety herein. In general, WO2015/124772 describes unmixing using a group sparsity framework, in which fractions of stain contributions from a plurality of colocation markers are modeled within a "same group" and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers. Moreover, WO2015124772 describes a method of unmixing by inputting image data obtained from the biological tissue sample, reading reference data from an electronic memory, the reference data being descriptive of the stain color of each one of the multiple stains, reading colocation data from electronic memory, the colocation data being descriptive of groups of the stains, each group comprising stains that can be collocated in the biological tissue sample, and each group forming a group for the group lasso criterion, at least one of the groups having a size of two or above, and calculating a solution of the group lasso criterion for obtaining the unmixed image using the reference data as a reference matrix. In some embodiments, the method for unmixing an image may comprise generating a group sparsity model wherein a fraction of a stain contribution from colocalized markers is assigned within a single group and a fraction of a stain contribution from non-colocalized markers is assigned within separate groups, and solving the group sparsity model using an unmixing algorithm to yield a least squares solution within each group.

Other System Components

The system 200 of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the paraffin is removed, any number of substances can be successively applied to the specimen. The substances can be for pretreatment (e.g., to reverse protein-crosslinking, expose cells acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated cells acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

After the specimens are processed, a user can transport specimen-bearing slides to the imaging apparatus. In some embodiments, the imaging apparatus is a brightfield imager slide scanner. One brightfield imager is the iScan Coreo brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES; or as disclosed in U.S. Publication 2014/0377753 or International Patent Application No. PCT/US2010/002772, the disclosures of which are hereby incorporated by reference herein in their entireties.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

ADDITIONAL EMBODIMENTS

Additional Embodiment 1. A system for identifying clusters of cells within a sample image of a biological specimen stained with a primary stain or stained for the presence of one or more biomarkers, the system comprising: (i) one or more processors, and (ii) one or more memories coupled to the one or more processors, the one or more memories to store computer-executable instructions that, when executed by the one or more processors, cause the system to perform operations comprising:
  a. detecting cells in the sample image using a trained object detection engine, wherein the trained object detection engine comprises a convolutional neural network adapted to detect cellular features within the sample image;
  b. extracting cellular features from one or more layers of the convolutional neural network; and
  c. clustering the detected cells in the sample image based on the extracted cellular features to provide one or more homogeneous clusters of detected cells.

Additional Embodiment 2. The system of additional embodiment 1, wherein the trained object detection engine comprises a region-based convolutional neural network.

Additional Embodiment 3. The system of additional embodiment 2, wherein the region-based convolution neural network comprises Fast-RCNN.

Additional Embodiment 4. The system of additional embodiment 2, wherein the trained object detection engine further comprises a region proposal network.

Additional Embodiment 5. The system of additional embodiment 4, wherein the trained object detection engine comprises Faster-RCNN.

Additional Embodiment 6. The system of additional embodiment 1, wherein the convolutional neural network comprises LeNet, AlexNet, ZF Net, DetectNet, GoogleNet, VGGNet, VGG16, or DenseNet.

Additional Embodiment 7. The system of additional embodiment 1, wherein the convolutional neural network is a deep residual network.

Additional Embodiment 8. The system of additional embodiment 7, wherein the deep residual network comprises ResNet.

Additional Embodiment 9. The system of additional embodiment 1, wherein the object detection engine trained comprises a convolutional neural network trained using a dataset comprising a plurality of training images, wherein each training image of the plurality of training images is derived from a biological specimen stained with a primary stain or stained for the presence of one or more biomarkers.

Additional Embodiment 10. The system of additional embodiment 9, wherein each training image of the plurality of training images does not comprise class labels.

Additional Embodiment 11. The system of additional embodiment 9, wherein each training image of the plurality of training images does not comprise any pathologist annotations.

Additional Embodiment 12. The system of additional embodiment 9, wherein each training image of the plurality of training images comprises at least one class label.

Additional Embodiment 13. The system of additional embodiment 12, wherein the operations further comprise classifying the detected cells.

Additional Embodiment 14. The system of additional embodiment 1, wherein the convolutional neural network comprises at least one scaling layer.

Additional Embodiment 15. The system of additional embodiment 14, wherein the at least one scaling layer scales the sample image by a constant factor.

Additional Embodiment 16. The method of additional embodiment 1, wherein the clustering of the detected cells comprises performing agglomerative hierarchical clustering.

Additional Embodiment 17. The system of additional embodiment 1, wherein the system is adapted for receiving one or more annotations corresponding to at least one of the one or more homogeneous clusters of cells in the sample image.

Additional Embodiment 18. The system of additional embodiment 17, wherein the operations further comprise training a cell detection and classification engine using the received annotations.

Additional Embodiment 19. The system of additional embodiment 18, wherein the cell detection and classification engine comprises a neural network.

Additional Embodiment 20. The system of additional embodiment 19, wherein the neural network of the cell detection and classification engine is adapted from LeNet, AlexNet, ZF Net, DetectNet, GoogleNet, VGGNet, VGG16, DenseNet, or ResNet.

Additional Embodiment 21. The system of additional embodiment 18, wherein the operations further comprise detecting cells in a test image using the trained cell detection and classification engine.

Additional Embodiment 22. The system of additional embodiment 21, wherein the operations further comprise classifying cells in the test image.

Additional Embodiment 23. The system of additional embodiment 21, wherein the test image comprises at least one stain.

Additional Embodiment 24. The system of additional embodiment 23, wherein the at least one stain of the test image is a cellular stain.

Additional Embodiment 25. The system of additional embodiment 23, wherein the at least one stain of the test image is a membrane stain.

Additional Embodiment 26. The system of additional embodiment 17, wherein the operations further comprise fine-tuning the trained object detection engine using the received annotations to provide a fine-tuned object detection engine.

Additional Embodiment 27. The system of additional embodiment 26, wherein the operations further comprise detecting and/or classifying cells in a test image using the fine-tuned object detection engine.

Additional Embodiment 28. A non-transitory computer-readable medium storing instructions for identifying clusters of cells within a sample image of a biological specimen stained for the presence of one or more biomarkers comprising:
  (a) detecting cells in the sample image using a trained object detection engine, wherein the trained object detection engine comprises a convolutional neural network adapted to detect cellular features within the sample image;
  (b) extracting cellular features from one or more layers of the convolutional neural network; and
  (c) clustering the detected cells in the sample image based on the extracted cellular features to provide one or more homogeneous clusters of detected cells.

Additional Embodiment 29. The non-transitory computer-readable medium of additional embodiment 28, wherein the convolutional neural network is adapted from LeNet, AlexNet, ZF Net, DetectNet, GoogleNet, VGGNet, VGG16, and DenseNet.

Additional Embodiment 30. The non-transitory computer-readable medium of additional embodiment 28, wherein the convolutional neural network is a deep residual network.

Additional Embodiment 31. The non-transitory computer-readable medium of additional embodiment 30, wherein the deep residual network is adapted from ResNet.

Additional Embodiment 32. The non-transitory computer-readable medium of additional embodiment 28, further comprising instructions for training a cell detection and classification engine using pathologist annotations corresponding to at least one of the one or more homogeneous clusters of cells in the sample image.

Additional Embodiment 33. The non-transitory computer-readable medium of additional embodiment 32, further comprising instructions for detecting cells in a test image using the trained cell detection and classification engine.

Additional Embodiment 34. The non-transitory computer-readable medium of additional embodiment 28, further comprising instructions for fine-tuning the trained object detection engine using received annotations for the at least one of the one or more homogeneous clusters of cells in the sample image to provide a fine-tuned object detection engine.

Additional Embodiment 35. The non-transitory computer-readable medium of additional embodiment 34, further comprising instructions for detecting cells in a test image using the fine-tuned object detection engine.

Additional Embodiment 36. The non-transitory computer-readable medium of additional embodiment 28, wherein the object detection engine is trained using a dataset comprising a plurality of training images from biological specimens stained for the presence of one or more biomarkers.

Additional Embodiment 37. The non-transitory computer-readable medium of additional embodiment 28, wherein the object detection engine is trained using a dataset comprising plurality of training images, wherein each training image of the plurality of training images does not comprise any class labels.

Additional Embodiment 38. The non-transitory computer-readable medium of additional embodiment 28, wherein the convolutional neural network comprises at least one scaling layer.

Additional Embodiment 39. A method of detecting cells in a test image of a biological specimen stained for the presence of one or more biomarkers comprising:
  (a) determining cellular features within the test image of the biological specimen by inputting the test image into a first portion of a trained cell detection and classification engine, wherein the first portion comprises a convolutional neural network configured for detecting cellular features; and
  (b) detecting the cells in the test image based on the determined cellular features by inputting the determined features of the test image into a second portion of the trained cell detection and classification engine, wherein the second portion comprises at least a region proposal network.

Additional Embodiment 40. The method of additional embodiment 39, further comprising classifying the detected cells in the test image.

Additional Embodiment 41. The method of additional embodiment 39, wherein the cell detection and classification engine is trained using ground truth data, wherein the ground truth data comprises pathologist annotations corresponding to one or more identified homogeneous clusters of cells in a sample image.

Additional Embodiment 42. The method of additional embodiment 41, wherein the homogeneous clusters of cells are identified by: (i) providing a sample image to a trained object detection engine; (ii) detecting cells in the sample image using the trained object detection engine; (iii) extracting a plurality of cellular features from at least one of the convolutional layers within the trained object detection engine; and (iv) clustering the detected cells in the test image based on the extracted cellular features.

Additional Embodiment 43. The method of additional embodiment 39, wherein the convolutional neural network is a deep residual network.

Additional Embodiment 44. The method of additional embodiment 39, wherein the deep residual network is adapted from ResNet.

Additional Embodiment 45. A method of identifying clusters of cells within a sample image of a biological specimen stained for the presence of one or more biomarkers comprising:
  a. detecting cells in the sample image using a trained object detection engine, wherein the trained object detection engine comprises a convolutional neural network and a region proposal network, wherein the convolutional neural network is configured to identify cellular features and wherein the region proposal network is configured to detect cells based on the identified cellular features;
  b. extracting the identified cellular features from one or more layers of the convolutional neural network; and
  c. clustering the detected cells in the sample image based on the extracted cellular features to provide one or more homogeneous clusters of detected cells.

Additional Embodiment 46. The method of additional embodiment 45, wherein the trained object detection engine comprises a region-based convolutional neural network.

Additional Embodiment 47. The method of additional embodiment 46, wherein the region-based convolution neural network is adapted from Fast-RCNN.

Additional Embodiment 48. The method of additional embodiment 46, wherein the trained object detection engine further comprises a region proposal network.

Additional Embodiment 49. The method of additional embodiment 48, wherein the trained object detection engine is adapted from Faster-RCNN.

Additional Embodiment 50. The method of additional embodiment 45, wherein the convolutional neural network is adapted from LeNet, AlexNet, ZF Net, DetectNet, GoogleNet, VGGNet, VGG16, and DenseNet.

Additional Embodiment 51. The method of additional embodiment 45, wherein the convolutional neural network is an autoencoder neural network.

Additional Embodiment 52. The method of additional embodiment 45, wherein the convolutional neural network is a deep residual network.

Additional Embodiment 53. The method of additional embodiment 52, wherein the deep residual network is adapted from ResNet.

Additional Embodiment 54. The method of additional embodiment 45, wherein the convolutional neural network is trained using a dataset comprising a plurality of training images of biological specimens stained for the presence of one or more biomarkers.

Additional Embodiment 55. The method of additional embodiment 54, wherein each training image of the plurality of training images does not comprise class labels.

Additional Embodiment 56. The method of additional embodiment 54, wherein each training image of the plurality of training images does not comprise any pathologist annotations.

Additional Embodiment 57. The method of additional embodiment 54, wherein each training image of the plurality of training images comprises at least one class label.

Additional Embodiment 58. A method of detecting and classifying cells in a test image of a biological specimen stained for the presence of one or more biomarkers comprising:
  (a) determining cellular features within the test image of the biological specimen by inputting the test image into a first portion of a trained cell detection and classification engine, wherein the first portion comprises a neural network configured for detecting cellular features; and
  (b) detecting the cells in the test image based on the determined cellular features by inputting the determined features of the test image into a second portion of the trained cell detection and classification engine, wherein the second portion comprises a trained classifier.

Additional Embodiment 59. The method of additional embodiment 58, wherein the trained classifier comprises a support vector machine or a random forest ensemble learning method.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A system for identifying clusters of cells within a sample image of a biological specimen stained with a primary stain or stained for the presence of one or more biomarkers, the system comprising: (i) one or more processors, and (ii) one or more memories coupled to the one or more processors, the one or more memories to store computer-executable instructions that, when executed by the one or more processors, cause the system to perform operations comprising:
  a. detecting cells in the sample image using a trained object detection engine, wherein the trained object detection engine comprises a convolutional neural network adapted to detect cellular features within the sample image;
b. extracting cellular features from one or more layers of the convolutional neural network; and
c. clustering the detected cells in the sample image based on the extracted cellular features to provide one or more homogeneous clusters of detected cells, wherein the clustering of the detected cells comprises performing agglomerative hierarchical clustering.

2. The system of claim 1, wherein the trained object detection engine comprises one of Fast-RCNN or Faster-RCNN.

3. The system of claim 1, wherein the trained object detection engine further comprises a region proposal network.

4. The system of claim 1, wherein the convolutional neural network is a deep residual network.

5. The system of claim 1, wherein training of the trained object detection engine is accomplished using a dataset comprising a plurality of training images, wherein each training image of the plurality of training images is derived from a biological specimen stained with a primary stain or stained for the presence of one or more biomarkers.

6. The system of claim 5, wherein each training image of the plurality of training images does not comprise any pathologist annotations.

7. The system of claim 5, wherein each training image of the plurality of training images comprises at least one class label.

8. The system of claim 1, wherein the convolutional neural network comprises at least one scaling layer.

9. The system of claim 1, wherein the operations further comprise (i) training a cell detection and classification engine using one or more class labels associated with the one or more homogeneous clusters of cells in the sample image; and (ii) detecting and/or classifying cells in a test image comprising at least one stain using the trained cell detection and classification engine; wherein the cell detection and classification engine comprises a neural network.

10. A non-transitory computer-readable medium storing instructions for identifying clusters of cells within a sample image of a biological specimen stained for the presence of one or more biomarkers comprising:
a. detecting cells in the sample image using a trained object detection engine, wherein the trained object detection engine comprises a first portion and a second portion, wherein the first portion is configured to identify cellular features within the sample image and wherein the second portion is configured to detect the cells based on the identified cellular features;
b. extracting at least a portion of the identified cellular features from one or more layers of the first portion of the trained object detection engine; and
c. clustering the detected cells in the sample image based on the extracted cellular features to provide one or more homogeneous clusters of detected cells, wherein the clustering of the detected cells comprises performing agglomerative hierarchical clustering.

11. The non-transitory computer-readable medium of claim 10, wherein the first portion comprises one of a convolutional neural network or a deep residual network; and wherein the second portion comprises a region proposal network.

12. The non-transitory computer-readable medium of claim 10, wherein the object detection engine is trained using a dataset comprising a plurality of training images, wherein each training image of the plurality of training images is derived from a biological specimen stained with a primary stain or stained for the presence of one or more biomarkers.

13. A method of identifying clusters of cells within a sample image of a biological specimen stained for the presence of one or more biomarkers comprising:
a. detecting cells in the sample image using a trained object detection engine, wherein the trained object detection engine comprises a convolutional neural network and a region proposal network, wherein the convolutional neural network is configured to identify cellular features and wherein the region proposal network is configured to detect cells based on the identified cellular features;
b. extracting the identified cellular features from one or more layers of the convolutional neural network; and
c. clustering the detected cells in the sample image based on the extracted cellular features to provide one or more homogeneous clusters of detected cells, wherein the clustering of the detected cells comprises performing agglomerative hierarchical clustering.

14. The method of claim 13, wherein the convolutional neural network comprises a deep residual network.

15. The method of claim 13, wherein the object detection engine is trained using a dataset comprising a plurality of training images, wherein each training image of the plurality of training images is derived from a biological specimen stained with a primary stain or stained for the presence of one or more biomarkers.

16. The method of claim 15, wherein each training image of the plurality of training images does not comprise any pathologist annotations.

17. The method of claim 15, wherein each training image of the plurality of training images comprises at least one class label.

18. The method of claim 13, wherein the convolutional neural network comprises at least one scaling layer.

19. The method of claim 13, further comprising (i) training a cell detection and classification engine using one or more class labels associated with the one or more homogeneous clusters of cells in the sample image, and (ii) detecting and/or classifying cells in a test image comprising at least one stain using the trained cell detection and classification engine; wherein the cell detection and classification engine comprises a neural network.

* * * * *